United States Patent
Unnikrishnan et al.

(10) Patent No.: US 10,509,663 B1
(45) Date of Patent: Dec. 17, 2019

(54) AUTOMATIC DOMAIN JOIN FOR VIRTUAL MACHINE INSTANCES

(71) Applicant: Amazon Technologies, Inc., Seattle, WA (US)

(72) Inventors: Lekshmi Unnikrishnan, Redmond, WA (US); Manivannan Sundaram, Bothell, WA (US); Martin Chen Mao, Seattle, WA (US); Sivaprasad Venkata Padisetty, Bellevue, WA (US); Praerit Garg, Seattle, WA (US); Sameer Palande, Seattle, WA (US); Bradley Scott Murphy, Seattle, WA (US); Manoj Krishna Ghosh, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/614,230

(22) Filed: Feb. 4, 2015

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
CPC ............. G06F 9/45533; G06F 9/45558; G06F 2009/4557; H04L 12/22; H04L 63/10; H04L 63/20
(Continued)

(56) References Cited

U.S. PATENT DOCUMENTS 6,055,637 A   4/2000  Hudson et al.
6,209,036 B1  3/2001  Aldred et al.
(Continued)

FOREIGN PATENT DOCUMENTS

FR   2964813      3/2012
JP   2004355439   12/2004
(Continued)

OTHER PUBLICATIONS

Anonymous, "AWS Identity and Access Management Using IAM," dated Jun. 20, 2013, retrieved on Feb. 12, 2019 from https://web.archive.org/web/20130620090425if_/http://awsdocs.s3.amazonaws.com/IAM/latest/iam-ug.pdf, 219 pages.
(Continued)

*Primary Examiner* — Meng Ai T An
*Assistant Examiner* — Willy W Huaracha
(74) *Attorney, Agent, or Firm* — Davis Wright Tremaine LLP

(57) ABSTRACT

A customer submits a request to a virtual computer system service to launch a virtual machine instance and to join this instance to a managed directory. The service may obtain, from the customer, a domain name and Internet Protocol addresses for the selected directory, which is then stored within a systems management server. When launched, the instance may initiate an agent, which may communicate with the systems management server to obtain the configuration information. The agent may use this configuration information to establish a communications channel with the managed directory and create a temporary set of computer credentials that may be used to verify that the customer is authorized to join the virtual machine instance to the managed directory. If the credentials are valid, the managed directory may generate a computer account within the managed directory, which may be used to join the virtual machine instance to the managed directory.

20 Claims, 9 Drawing Sheets

(58) Field of Classification Search
USPC .......................................................... 718/1
See application file for complete search history.

(56) References Cited

U.S. PATENT DOCUMENTS

| | | | |
|---|---|---|---|
| 6,609,128 | B1 | 8/2003 | Underwood |
| 7,574,202 | B1 | 8/2009 | Tsao et al. |
| 8,045,486 | B2 * | 10/2011 | Swan ..................... H04L 41/12 370/255 |
| 8,145,798 | B1 | 3/2012 | Buck et al. |
| 8,224,994 | B1 | 7/2012 | Schneider |
| 8,255,984 | B1 | 8/2012 | Ghostine et al. |
| 8,307,003 | B1 | 11/2012 | Sheth et al. |
| 8,346,824 | B1 | 1/2013 | Lyle et al. |
| 8,533,796 | B1 | 9/2013 | Shenoy et al. |
| 8,656,471 | B1 | 2/2014 | Allen et al. |
| 8,856,506 | B2 * | 10/2014 | Weber ................... G06F 9/4401 713/2 |
| 9,213,513 | B2 | 12/2015 | Hartz et al. |
| 9,639,384 | B2 * | 5/2017 | Govindankutty ... G06F 9/45533 |
| 9,678,769 | B1 * | 6/2017 | Scott ....................... G06F 9/455 |
| 2002/0143943 | A1 | 10/2002 | Lee et al. |
| 2003/0074448 | A1 | 4/2003 | Kinebuchi et al. |
| 2003/0229645 | A1 | 12/2003 | Mogi et al. |
| 2004/0205152 | A1 | 10/2004 | Yasuda et al. |
| 2005/0102513 | A1 * | 5/2005 | Alve ................... H04L 63/0442 713/168 |
| 2005/0203993 | A1 | 9/2005 | Grobman et al. |
| 2006/0059252 | A1 | 3/2006 | Tatsubori et al. |
| 2007/0112877 | A1 | 5/2007 | Harvey et al. |
| 2007/0143829 | A1 | 6/2007 | Hinton et al. |
| 2007/0300220 | A1 * | 12/2007 | Seliger ..................... G06F 8/61 718/1 |
| 2007/0300221 | A1 * | 12/2007 | Hartz ..................... G06F 3/1222 718/1 |
| 2008/0016143 | A1 | 1/2008 | Bumpus et al. |
| 2008/0046593 | A1 | 2/2008 | Ando et al. |
| 2008/0140618 | A1 * | 6/2008 | Kumar ............... H04L 61/1505 |
| 2008/0208853 | A1 | 8/2008 | Vismans et al. |
| 2008/0320566 | A1 * | 12/2008 | Herzog ................. G06F 21/33 726/4 |
| 2009/0089625 | A1 | 4/2009 | Kannappan et al. |
| 2009/0112875 | A1 | 4/2009 | Maes |
| 2009/0157850 | A1 | 6/2009 | Gagliardi et al. |
| 2009/0178132 | A1 | 7/2009 | Hudis et al. |
| 2009/0198835 | A1 | 8/2009 | Madhusudanan et al. |
| 2009/0249439 | A1 | 10/2009 | Olden et al. |
| 2009/0288084 | A1 | 11/2009 | Astete et al. |
| 2009/0328178 | A1 | 12/2009 | McDaniel et al. |
| 2010/0017889 | A1 | 1/2010 | Newstadt et al. |
| 2010/0122248 | A1 | 5/2010 | Robinson et al. |
| 2010/0142401 | A1 | 6/2010 | Morris |
| 2010/0254375 | A1 | 10/2010 | Feuerhahn et al. |
| 2011/0066668 | A1 | 3/2011 | Guarraci |
| 2011/0099147 | A1 | 4/2011 | McAlister et al. |
| 2011/0185355 | A1 | 7/2011 | Chawla et al. |
| 2011/0191834 | A1 * | 8/2011 | Singh ..................... G06F 17/00 726/6 |
| 2011/0251992 | A1 * | 10/2011 | Bethlehem .......... H04L 12/2863 707/610 |
| 2011/0314520 | A1 | 12/2011 | Olszewski et al. |
| 2012/0001578 | A1 | 1/2012 | Hinton et al. |
| 2012/0017271 | A1 | 1/2012 | Smith et al. |
| 2012/0030673 | A1 | 2/2012 | Sakamoto |
| 2012/0066348 | A1 | 3/2012 | Alnas |
| 2012/0110055 | A1 | 5/2012 | Van Biljon et al. |
| 2012/0110574 | A1 | 5/2012 | Kumar |
| 2012/0179802 | A1 | 7/2012 | Narasimhan et al. |
| 2012/0179820 | A1 * | 7/2012 | Ringdahl ................. G06F 8/63 709/225 |
| 2012/0198022 | A1 | 8/2012 | Black et al. |
| 2012/0233314 | A1 | 9/2012 | Jakobsson |
| 2012/0246738 | A1 | 9/2012 | Shah et al. |
| 2012/0266168 | A1 | 10/2012 | Spivak et al. |
| 2012/0281708 | A1 | 11/2012 | Chauhan et al. |
| 2012/0290630 | A1 | 11/2012 | Aizman et al. |
| 2013/0007845 | A1 | 1/2013 | Chang et al. |
| 2013/0034021 | A1 | 2/2013 | Jaiswal et al. |
| 2013/0042115 | A1 | 2/2013 | Sweet et al. |
| 2013/0054639 | A1 | 2/2013 | Sharma et al. |
| 2013/0066834 | A1 | 3/2013 | McAlister et al. |
| 2013/0167145 | A1 | 6/2013 | Krishnamurthy et al. |
| 2013/0174216 | A1 | 7/2013 | Simske et al. |
| 2013/0191828 | A1 * | 7/2013 | Wells ..................... G06F 8/63 718/1 |
| 2013/0198340 | A1 | 8/2013 | Ukkola et al. |
| 2013/0227140 | A1 | 8/2013 | Hinton et al. |
| 2013/0230042 | A1 | 9/2013 | Shatsky et al. |
| 2013/0238808 | A1 | 9/2013 | Hallem et al. |
| 2013/0247036 | A1 | 9/2013 | Fujiwara |
| 2013/0254847 | A1 | 9/2013 | Adams et al. |
| 2013/0283270 | A1 | 10/2013 | Holland et al. |
| 2013/0283298 | A1 | 10/2013 | Ali et al. |
| 2014/0040993 | A1 | 2/2014 | Lorenzo et al. |
| 2014/0075501 | A1 | 3/2014 | Srinivasan et al. |
| 2014/0201735 | A1 * | 7/2014 | Kannan ............... G06F 9/45558 718/1 |
| 2014/0250075 | A1 | 9/2014 | Broido et al. |
| 2014/0282510 | A1 | 9/2014 | Anderson et al. |
| 2014/0298398 | A1 | 10/2014 | Neely |
| 2014/0325622 | A1 | 10/2014 | Luk et al. |
| 2014/0365549 | A1 | 12/2014 | Jenkins |
| 2015/0058837 | A1 * | 2/2015 | Govindankutty ... G06F 9/45533 718/1 |
| 2015/0089061 | A1 | 3/2015 | Li et al. |
| 2015/0237149 | A1 | 8/2015 | MacLnnis |
| 2017/0337071 | A1 * | 11/2017 | Scott ....................... G06F 9/455 |

FOREIGN PATENT DOCUMENTS

| | | |
|---|---|---|
| JP | 2005004648 | 1/2005 |
| JP | 2005258672 | 9/2005 |
| JP | 2009519530 | 5/2009 |
| JP | 2009176097 | 8/2009 |
| JP | 2010027028 | 2/2010 |
| JP | 2010092475 | 4/2010 |
| JP | 2011186637 | 9/2011 |
| JP | 2012032956 | 2/2012 |
| JP | 2012123459 | 6/2012 |
| JP | 2013084235 | 5/2013 |
| JP | 2013527532 | 6/2013 |
| JP | 2013532854 | 8/2013 |
| JP | 2013540314 | 10/2013 |
| JP | 2015503782 | 2/2015 |
| JP | 2016540295 | 12/2016 |
| WO | WO2011106716 | 9/2011 |
| WO | WO2013146537 | 10/2013 |

OTHER PUBLICATIONS

Anonymous, "Microsoft Windows Server 2008R2 Directory Services (DS) on Amazon EC2," Oct. 21, 2012, retrieved on May 10, 2017, from internet at web.archive.org/web/20121021194026/awsmedia.s3.amazonaws.com/pdf/EC2_AD_How_to.pdf, 8 pages.

Anonymous, "VCloud Automation Center Operating Guide for vCloud Automation Center 5.2," VMware, Jul. 17, 2013, retrieved on May 8, 2017, from web-beta.archive.org/web/20130717235803/http://www.vmware.com/pdf/vcac-52-operating-guide.pdf, 332 pages.

Bucicoiu et al., "Secure Cloud Video Streaming Using Tokens," RoEduNet Conference 13th Edition: Networking in Education and Research Joint Event RENAM 8th Conference, Jan. 2014, 6 pages.

Canadian Notice of Allowance for Patent Application No. 2,930,253 dated Dec. 7, 2017, 1 page.

Canadian Notice of Allowance for Patent Application No. 2,930,255 dated Apr. 2, 2019, 1 page.

Canadian Notice of Allowance for Patent Application No. 2,930,292 dated Feb. 1, 2019, 1 page.

Canadian Office Action for Patent Application No. 2,930,255 dated Apr. 16, 2018, 5 pages.

Canadian Office Action for Patent Application No. 2,930,281 dated Nov. 23, 2017, 6 pages.

(56) References Cited

OTHER PUBLICATIONS

Canadian Office Action for Patent Application No. 2,930,292 dated Feb. 9, 2018, 4 pages.
Canadian Office Action, dated Oct. 22, 2018, for Patent Application No. 2,930,281, 4 pages.
Carrion et al., "A Generic Catalog and Repository Service for Virtual Machine Images," 2010, University of Valencia, retrieved from internet www.researchgate.net/profile/German_Molto/publication/233906883_A_Generic_Catalog_and_Repository_Service_for_Virtual_Machine_Images/links/0fcfd50cbb119a1184000000.pdf, 15 pages.
Chinese First Office Action for Patent Application No. 201480068648.0 dated Dec. 12, 2018, 8 pages.
Chinese First Office Action for Patent Application No. 201480068732.2 dated Jun. 15, 2018, 12 pages.
Chinese First Office Action for Patent Application No. 201480068869.8 dated Jun. 27, 2018, 12 pages.
Chinese First Office Action for Patent Application No. 201480072547.0 dated Jul. 2, 2018, 16 pages.
Chinese Notice of Grant for Patent Application No. 201480068732.2 dated Mar. 15, 2019, 4 pages.
Chinese Notice of Grant for Patent Application No. 201480068869.8 dated Mar. 14, 2019, 4 pages.
Chinese Second Office Action for Patent Application No. 201480068732.2 dated Nov. 21, 2018, 7 pages.
Chinese Second Office Action for Patent Application No. 201480072547.0, dated Feb. 11, 2019, 12 pages.
European Communication pursuant to Article 94(3) EPC dated Apr. 17, 2018, for Application No. 14859670.3, 3 pages.
European Communication under Rule 71(3) EPC for Application No. 14859670.3, Intention to Grant, dated Jan. 3, 2019, 58 pages.
European Communication Under Rule 71(3) EPC for Application No. 14860094.3, Intention to Grant, dated Jul. 5, 2018, 57 pages.
European Communication under Rule 71(3) EPC for Application No. 14860654.4, Intention to Grant, dated Jul. 16, 2018, 149 pages.
European Communication under Rule 71(3) EPC for Application No. 14861058.7, Intention to Grant, dated Jun. 29, 2018, 55 pages.
European Search Report dated Feb. 22, 2019, for Patent Application No. EP18204451, 9 pages.
International Search Report and Written Opinion dated Feb. 11, 2015, International Patent Application No. PCT/US2014/065081, filed Nov. 11, 2014.
International Search Report and Written Opinion dated Feb. 19, 2015, International Patent Application No. PCT/US2014/065084, filed Nov. 11, 2014.
International Search Report and Written Opinion dated Feb. 23, 2015, International Patent Application No. PCT/US2014/065088, filed Nov. 11, 2014.
International Search Report and Written Opinion dated Feb. 4, 2015, International Patent Application No. PCT/US2014/064894, filed Nov. 10, 2014.
Japanese Decision to Grant dated Jun. 11, 2018 for Patent Application No. 2016528232, 6 pages.
Japanese Decision to Grant for Patent Application No. 2016-528219 dated Aug. 20, 2018, 6 pages.
Japanese Final Rejection, dated Dec. 18, 2017, for Patent Application No. 2016-528232, 6 pages.
Japanese First Office Action for Patent Application No. 2016-528217 dated Feb. 2, 2019, 5 pages.
Japanese Office Action, dated Oct. 11, 2017, for Application No. 2016-528219, 10 pages.
Japanese Patent Application No. 2016-528217, Decision to Grant a Patent, dated Jan. 15, 2018, filed Nov. 10, 2014, 6 pages.
Lopez et al., "Providing secure mobile access to information servers with temporary certificates," 1999, retrieved from ac.els-cdn.com/S138912869900105X/1-s2.0-S138912869900105X-main.pdf?_tid=8d31c448-e679-11e6-b14f-00000aacb35f&acdnat=1485732221_f0f3684af0254bee6476a83214f9cf32, 5 pages.
Chinese Second Office Action dated Jun. 25, 2019, for Patent Application No. 201480068648.0, 9 pages.
Japanese Notice to Grant, dated Jul. 8, 2019, for Patent Application No. 2018-073523, 6 pages.
Japanese Office Action, dated Jun. 17, 2019, for Patent Application No. 2018-073523, 3 pages.
Canadian Office Action for Patent Application No. 2,930,281 dated Oct. 3, 2019, 5 pages.
Chinese Decision to Grant for Application No. 201480068648.0 dated Sep. 27, 2019, 4 pages.

* cited by examiner

AUTOMATIC DOMAIN JOIN FOR VIRTUAL MACHINE INSTANCES

CROSS REFERENCE TO RELATED APPLICATION

This application incorporates by reference for all purposes U.S. patent application Ser. No. 14/098,323, filed on Dec. 5, 2013, entitled "AUTOMATED DIRECTORY JOIN FOR VIRTUAL MACHINE INSTANCES".

BACKGROUND

Virtual machine instances are often configured to join one or more managed directories to enable users of these virtual machine instances to access certain data. For instance, an administrator of a virtual machine instance may use a set of credentials to authenticate himself/herself and perform one or more actions to join the virtual machine instance to a managed directory. This process can be performed manually, wherein the administrator uses his/her credentials through a graphical user interface or other application to join the virtual machine instance to a managed directory. However, the process of performing the domain join between the virtual machine instance and a managed directory can be labor intensive, adding expense and potential for error in the process. Additionally, this process may further expose the administrator's credentials as these credentials may be required to join the virtual machine instance to a managed directory within an alternative network.

BRIEF DESCRIPTION OF THE DRAWINGS

Various embodiments in accordance with the present disclosure will be described with reference to the drawings, in which.

DETAILED DESCRIPTION

Figure 1:
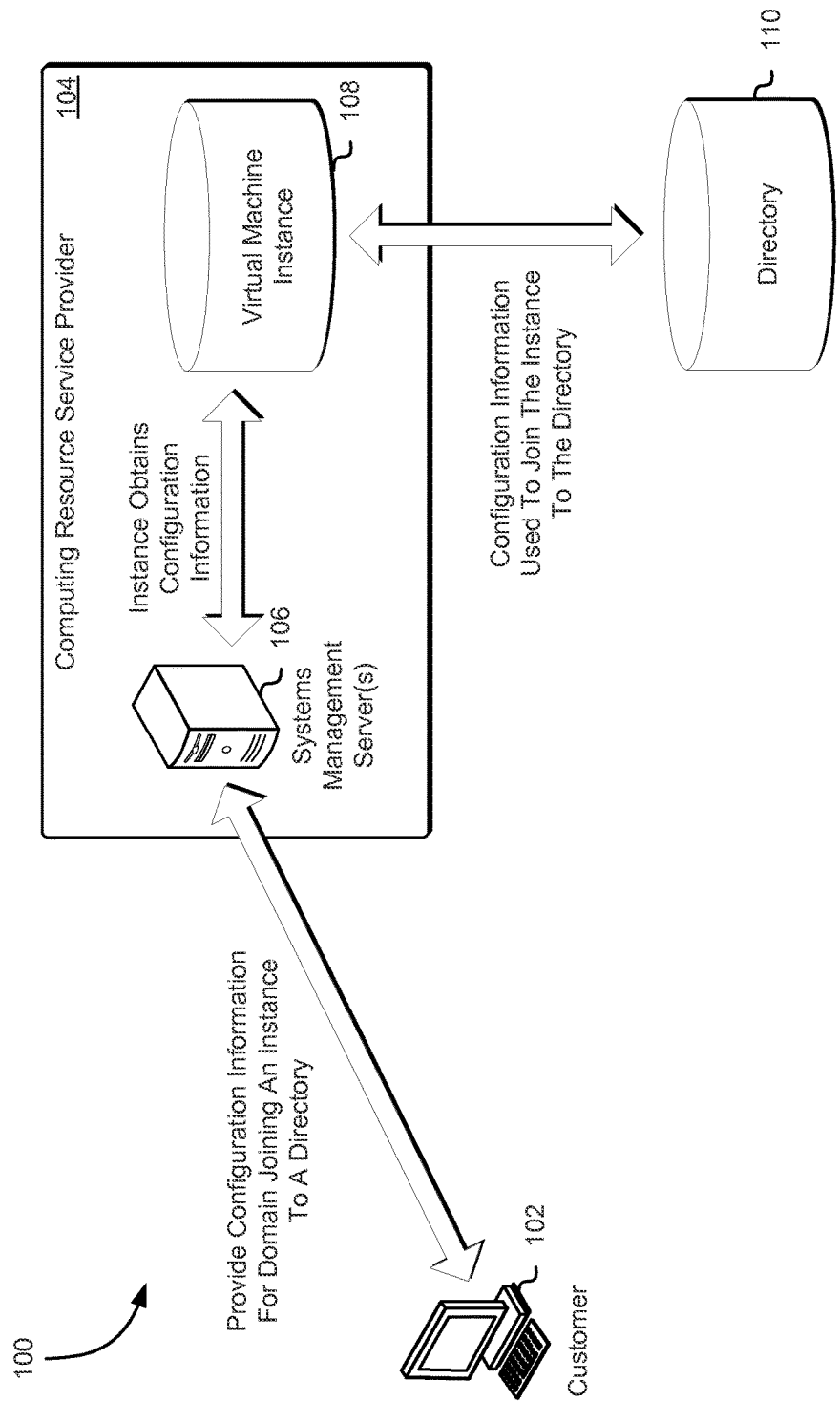
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to the automatic joining of a virtual machine instance to a managed directory through domain join operations. In an embodiment, an entity (e.g., an organization), through a virtual computer system service, submits a request to launch a virtual machine instance that may be utilized by the entity and other delegated users. The entity, through the request, may specify that the virtual machine instance may be joined to a managed directory. For instance, the entity may interact with the virtual computer system service through a graphical user interface (GUI) configured to transmit one or more application programming interface (API) calls to the service to select, from a plurality of managed directories, which managed directory the virtual machine instance should be joined to. Upon selection of the managed directory, the GUI may obtain, from a managed directory service, network address information (e.g., a fully qualified domain name (FQDN) and one or more domain name system (DNS) Internet Protocol (IP) addresses) for the selected managed directory. Alternatively, the entity may manually input the network address information for the managed directory if the managed directory is located within an on-premises customer network or other network. Information included within the request regarding the managed directory is subsequently stored within a systems management server. The entity may be a customer of a computing resource service provider that operates various services such as a managed directory service, object-based data storage services, database services, the aforementioned virtual computer system service and a plurality of other services.

In an embodiment, the virtual computer system service, in response to the request from the entity, launches the specified virtual machine instance. The virtual machine instance may include an agent operating within the virtual machine instance. This agent may be configured to transmit, in response to a triggering event or after a period of time has elapsed, a request to the systems management server to obtain the network address information for the particular managed directory to which the virtual machine instance is to be joined. For instance, the agent may transmit the request for the network address information of the particular managed directory, along with an identifier or other information corresponding to the entity, to the systems management server to obtain the required network address information for joining the virtual machine instance to the particular managed directory.

Once the agent has received the network address information for the particular managed directory, the agent may transmit a request to a directory domain controller to create a computer account for joining the virtual machine instance to the managed directory. For instance, in an embodiment, if the managed directory is located within an on-premises customer network and the entity is authorized to join the virtual machine instance to a managed directory, the agent will generate a set of temporary computer credentials associated with the virtual machine instance and transmit the request and the set of temporary computer credentials to a directory domain controller within the on-premises customer network. This directory domain controller may determine whether the set of temporary computer credentials are authentic and verify that the computer account may be created and utilized for domain joining the virtual machine instance to the managed directory. Alternatively, if the managed directory is managed and operated by a managed directory service, the agent may utilize the network address information to transmit a request to the managed directory service for creation of the computer account. Once the computer account has been created, the agent may expose an API, which the operating system of the virtual machine instance may utilize to access the directory domain controller and join the virtual machine instance to the managed directory.

In an embodiment, the entity can authorize other users to access the virtual machine instance and the managed directory through use of their own computing resource service provider credentials for accessing the virtual machine instance. For instance, through the virtual computer system service, the entity may specify a plurality of users that may access the virtual machine instance on his/her behalf through use of their own credentials. Additionally, the entity may further specify which of these users may utilize the virtual machine instance to access the managed directory. For instance, if a delegated user is authorized to access the virtual machine instance but not the managed directory, the virtual computer system service may enable this delegated user to access the virtual machine instance but prevent the agent from establishing a connection with the managed directory.

In this manner, a customer is able to utilize an interface to launch a virtual machine instance and automatically have the virtual machine instance join a new or existing managed directory. Additionally, the techniques described and suggested herein facilitate additional technical advantages. For example, because the virtual machine instance is automatically joined to the managed directory, an entity may no longer be required to retrieve additional sets of credentials in order to manually join a virtual machine instance to the managed directory, whether the managed directory is maintained by a managed directory service or within an on-premises customer network. This, in turn, may allow the entity to make the directory available to other users in less time and thus reduce any downtime resulting from a delay in implementation of the directory. Further, this may allow the entity and other users to use a set of credentials corresponding to the computing resource service provider to access the virtual machine instance and the new or existing directory.

FIG. 1 shows an illustrative example of an environment 100 in which various embodiments can be implemented. In the environment 100, a computing resource service provider 104 provides various computing resource services to customers of the computing resource service provider. The computing resource service provider 104 may be an organization that hosts various computing resources on behalf of one or more customers 102. For example, a computing resource service provider 104 may operate one or more facilities that are used to host various computing hardware resources, such as hardware servers, data storage devices, network devices and other equipment, such as server racks, networking cables and the like. The computing resource service provider 104 may utilize its computing hardware resources to operate one or more services. Such services may include services that enable customers 102 of the computing resource service provider 104 to remotely manage computing resources to support the customers' 102 operations while reducing the needs of the customers 102 to invest in physical equipment. Example services include, but are not limited to, various data storage services (object-based data storage services, archival data storage services, database services and the like), identity management services, program execution services and other services. The services may be used by customers 102 to support a wide variety of activities, such as operating a website, operating enterprise systems supporting an organization, distributed computation and/or other activities.

The customer 102 may be an individual, organization or automated process that could utilize one or more services provided by the computing resource service provider 104 to provision and manage one or more resources to support his or her operations. The customer may further be an administrator or other domain user of a customer network, which may include a plurality of computing hardware resources which may be located at least in part on the customer premises. In some embodiments, the computing hardware resources that may be included within the customer network include hardware servers, data storage devices, network devices and other equipment, such as server racks, networking cables and the like. The customer 102 may utilize these computing hardware resources to operate one or more services, which may be utilized by a user, through a user client, to access computer system resources within the customer network. Accessing computer system resources may include creating resources, updating resources, deleting resources, obtaining information about the resources and the like.

In an embodiment, a customer 102, through an interface provided by the computing resource service provider 104, may submit a request to launch a virtual machine instance 108. For instance, the customer 102, through the interface, may select a virtual machine image comprising a desired operating system, applications and other data that may be instantiated onto a physical host provided by the computing resource service provider 104 for the customer's 102 use. In addition to the request to launch a virtual machine instance 108, the customer 102, through the interface, may specify that the virtual machine instance 108 should be joined to a particular managed directory 110. For instance, the customer 102 may specify, through the interface, managed directory configuration information for joining the virtual machine instance 108 to a managed directory 110 of the customer's 102 choosing. For example, in order to access the interface, a customer 102 may be required to provide his/her set of computing resource service provider 104 credentials. Through use of these credentials, the computing resource service provider 104 may determine whether the credentials are authentic and, if so, whether the customer 102 is authorized to access the interface. Further, the computing resource service provider 104 may utilize these credentials to determine whether the customer 102 has provisioned one or more managed directories 110 through the managed directory service provided by the computing resource service provider 104. If so, the computing resource service provider 104 may present to the customer 102 with one or more identifiers corresponding to these provisioned managed directories available to the customer 102. If the customer 102 selects one of these managed directories 110, the computing resource service provider 104 may obtain the configuration information (e.g., FQDN and one or more DNS IP addresses) for the selected managed directory 110. Alternatively, if the managed directory is maintained by the customer 102 or other administrator within an on-premises customer network, the customer 102 may manually provide, through the interface, the configuration information for the managed directory 110.

Once the customer 102 has submitted the request to launch the virtual machine instance 108 and has provided the necessary configuration information to enable domain joining of the virtual machine instance 108 to the managed directory 110, the computing resource service provider 104 may store the managed directory configuration information within a systems management server 106. The one or more systems management servers 106 may include at least one database specifying, for each customer 102, managed directory configuration information that may be used to join a virtual machine instance 108 to a managed directory 110. For instance, if the customer 102 selects an identifier for a managed directory 110 provided by the managed directory service, the computing resource service provider 104 may obtain the managed directory configuration information from the managed directory service and update the customer's 102 entry within the systems management server 106 to specify this information. Alternatively, if the customer 102 provides managed directory configuration information for a managed directory 110 within his/her on-premises network, the computing resource service provider 104 may use this information to update the customer's 102 entry within the systems management server 106.

When the computing resource service provider 104 launches the requested virtual machine instance 108 within a physical host, an agent within the virtual machine instance 108 may be initiated. The agent may be an application included with the virtual machine image configured to be executed when the virtual machine image is instantiated onto a physical host. This agent may be configured to access, in response to a triggering event or after a particular period of time, the systems management server 106 to determine whether there is configuration information available for one or more managed directories 110 that the agent is to join the virtual machine instance 108. For instance, in an embodiment, the agent is configured to transmit a request specifying the customer's 102 identifier (e.g., identifier used by the computing resource service provider 104 to identify the customer 102) to the systems management server 106 to determine whether the virtual machine instance 108 is to be joined to any managed directories 110.

When the systems management server 106 receives the request from the agent operating within the virtual machine instance 108, the systems management server 106 may utilize the supplied customer 102 identifier to determine whether any managed directories 110 are specified for the particular customer 102 entry. If there are any managed directories 110 available for the customer 102, the systems management server 106 may determine whether the customer 102 is authorized to join the virtual machine instance 108 to a managed directory 110. For instance, the systems management server 106 may access an identity management service (not shown) provided by the computing resource service provider 104 to identify any policies that are applicable for this particular customer 102. These policies may specify whether the customer 102 is authorized to access a managed directory 110 and whether the customer 102 is authorized to join any virtual machine instances 108 to this managed directory 110. If the customer 102 is not authorized to join a virtual machine instance 108 to a managed directory 110, the systems management server 106 may deny the agent's request to obtain the configuration information necessary to join the virtual machine instance 108 to the managed directory 110.

If the customer 102 is authorized to join the virtual machine instance 108 to a managed directory 110, the agent operating within the virtual machine instance 108 may obtain the configuration information for the managed directory 110 from the systems management server 106. In an embodiment, if the managed directory 110 is maintained by a managed directory service on behalf of the customer 102, the agent operating within the virtual machine instance 108 will utilize the configuration information to generate and transmit a request to a directory domain controller corresponding to the managed directory 110 to create a computer account within the managed directory 110, which may be used to join the virtual machine instance 108 to the managed directory 110. Alternatively, if the managed directory 110 is maintained within an on-premises customer network, the agent may generate a set of temporary computer credentials that may be used by the directory domain controller within the managed directory 110 in the customer network to verify that the customer 102 is authorized to access the managed directory 110 and to generate a computer account within the managed directory 110 for the virtual machine instance 108. Upon creation of the computer account within the managed directory 110, the agent may expose (make available) an API, which the operating system of the virtual machine instance 108 may utilize to transmit an API call to the directory domain controller of the managed directory 110 to join the virtual machine instance 108 to the managed directory 110. The directory domain controller 216 may cause the set of temporary computer credentials to expire once the virtual machine instance 208 has been joined to the managed directory 216.

Once the virtual machine instance 108 has been domain joined to the managed directory 110, the customer 102 may use his/her computing resource service provider 104 credentials to access both the virtual machine instance 108 and the managed directory 110. Additionally, the customer 102 may specify one or more delegated users that may access this virtual machine instance 108 and the managed directory 110. For instance, the customer 102 may access the identity management service to generate one or more policies for these delegated users defining the level of access to the virtual machine instance 108 and the managed directory 110. When a delegated user utilizes his/her computing resource service provider 104 credentials to access the virtual machine instance 108, the agent operating within the virtual machine instance 108 may access the identity management service to determine whether the delegated user is authorized to access the managed directory 110. If the delegated user is not authorized to access the managed directory 110, the agent may disable the ability of the delegated user to access the managed directory 110 through the virtual machine instance 108.

Figure 2:
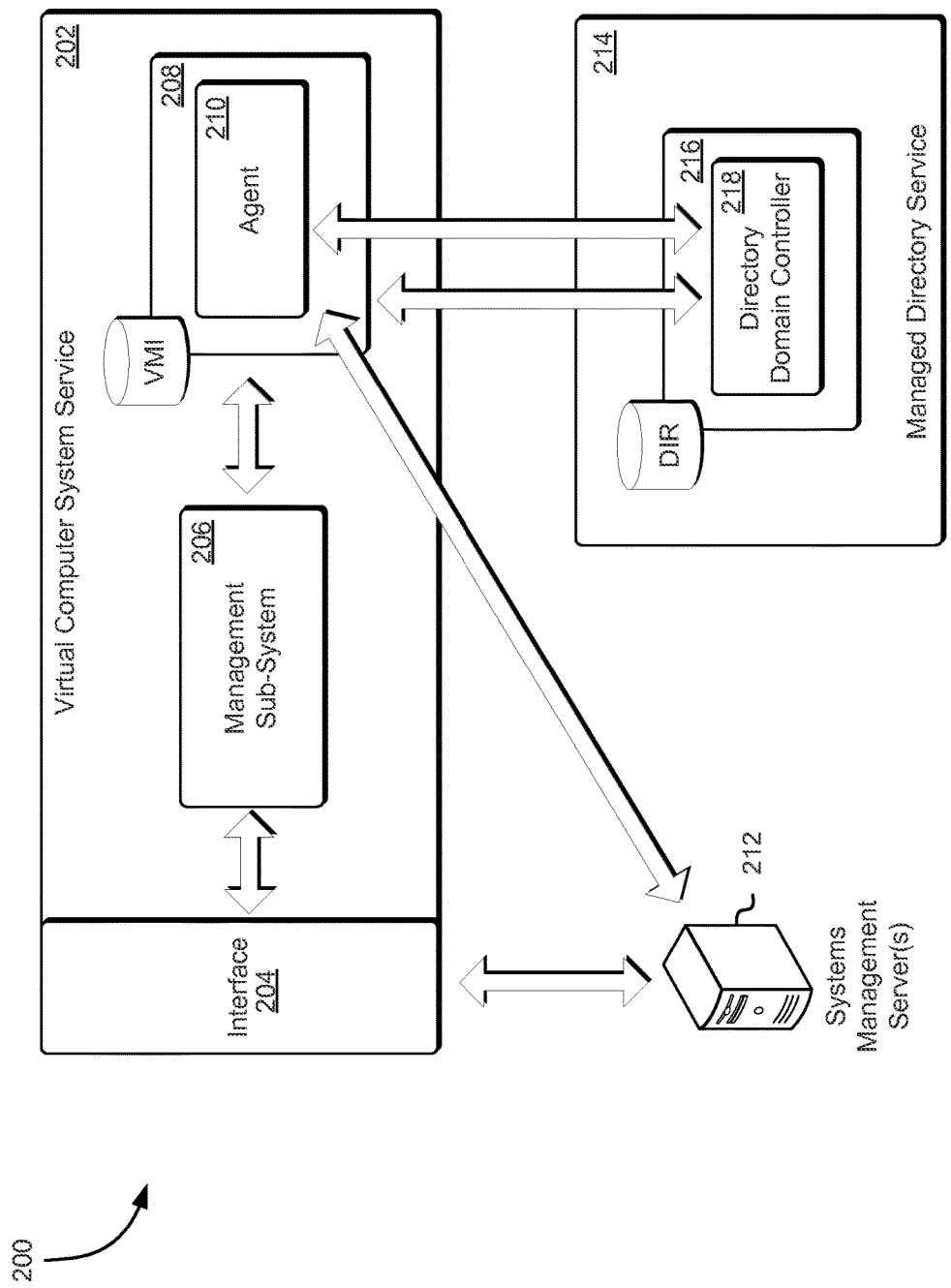
FIG. 2 shows an illustrative example of an environment in which a virtual machine instance is automatically joined to a managed directory provided by a managed directory service in accordance with at least one embodiment.

As noted above, a customer may submit a request to launch a virtual machine instance and join this virtual machine instance to a managed directory maintained by a managed directory service on behalf of the customer or other entity. The virtual machine instance may include an agent, which may be configured to utilize configuration information for the managed directory to establish a communications channel with the managed directory and enable joining of the virtual machine instance to the managed directory. Accordingly, FIG. 2 shows an illustrative example of an environment 200 in which a virtual machine instance 208 is automatically joined to a managed directory 216 provided by a managed directory service 214 in accordance with at least one embodiment. In the environment 200, a virtual computer system service 202 may provide customers with an interface 204 that may enable these customers to access the virtual computer system service 202. A customer may utilize the interface 204 through one or more communications networks, such as the Internet. The interface 204 may include certain security safeguards to ensure that the customer has authorization to access the virtual computer system service 202. For instance, in order to access the virtual computer system service 202, a customer may need to provide a username and a corresponding password or encryption key when using the interface 204. Additionally, requests (e.g., API calls) submitted to the interface 204 may require an electronic signature generated using a cryptographic key such that the electronic signature is verifiable by the virtual computer system service 202, such as by an authorization system (not shown).

Once the customer has gained access to the virtual computer system service 202 through the interface 204, the virtual computer system service 202 may allow the customer to interact, through the interface 204, with a management sub-system 206. For instance, the management sub-system 206 may enable a customer to remotely provision a virtual machine instance 208 by allowing the customer to select, from a plurality of virtual machine images, a virtual machine image comprising the operating system and applications necessary to fulfill the customer's needs. The interface 204 may also interact with the managed directory service 214, which may specify, for the particular customer, a variety of managed directories that may be accessible to the customer. For instance, when a customer provisions a managed directory 216 through the managed directory service 214, the managed directory service 214 may update a customer entry within a database to specify that this newly provisioned managed directory 216 is maintained on behalf of the customer. Further, for each managed directory, the managed directory service 214 may specify, within the database, the configuration information (e.g., FQDN and DNS IP addresses) for the managed directory. The interface 204 may provide, to the customer, with one or more identifiers for the managed directories available to the customer that can be utilized to join the virtual machine instance 208. Thus, the customer may utilize the interface 204 to select a virtual machine image for instantiation and a corresponding managed directory 214 to which the virtual machine instance 208 is to be joined.

The interface 204 may transmit this request from the customer to the management sub-system 206, which may obtain the virtual machine image that is to be instantiated onto a physical host for the use of the customer. Additionally, if the customer has specified that the virtual machine instance 208 is to be joined to a particular managed directory 216, the interface 204 may access the systems management server 212 to update a customer entry to specify the managed directory 216 that is to be utilized by the virtual machine instance for the domain join. This customer entry may further specify the configuration information for the managed directory 216 obtained from the managed directory service 214.

The virtual machine image may include an agent 210, which may be launched once the management sub-system 206 launches the virtual machine instance 208 within the selected physical host. The agent 210 may be configured to access the systems management server 212 to determine whether the virtual machine instance 208 is to be joined to a managed directory 216. For instance, when the customer accesses the virtual machine instance 208, the agent 210 may obtain the customer's identifier and transmit a request to the systems management server 212 to determine whether the virtual machine instance 208 is to be joined to a particular managed directory 216 specified by the customer. For example, the systems management server 212 may utilize the customer's identifier to identify a corresponding customer entry. As noted above, this customer entry may specify one or more managed directories that may be joined by the virtual machine instance 208. For each of these one or more managed directories, the customer entry may further specify the configuration information for the managed directory.

In an embodiment, when the systems management server 212 receives the request from the agent 210 to obtain configuration information for a particular managed directory 216, the systems management server 212 will access an identity management service (not shown) to determine whether the customer is authorized to access the managed directory 216 and join the virtual machine instance 208 to the managed directory 216. If the customer is not authorized to join the virtual machine instance 208 to the managed directory 216, the systems management server 212 may deny the request from the agent 210 to obtain the configuration information for the managed directory 216. Alternatively, if the customer is authorized to join the virtual machine instance 208 to the managed directory 214, the systems management server 212 may transmit the configuration information for the managed directory 216 to the agent 210.

When the agent 210 receives the configuration information for the managed directory 216 from the systems management server 212, the agent 210 may utilize the configuration information to establish a communications channel with the directory domain controller 218 of the managed directory 216 and request creation of a computer account corresponding to the virtual machine instance 208. For instance, in some embodiments, the agent 210 may generate a set of temporary computer credentials that the directory domain controller 218 may utilize to determine whether the customer is authorized to join the virtual machine instance 208 to the managed directory 216. This set of temporary computer credentials may be verified by the directory domain controller 218 through use of one or more algorithms corresponding to the particular customer to ensure that these credentials correspond to the customer and are valid. If the received credentials are valid, the directory domain controller 218 may generate, within the managed directory 216, a computer account corresponding to the virtual machine instance 208. Once the directory domain controller 218 has created a computer account within the managed directory 218, the agent 210 may expose an API, which the operating system of the virtual machine instance 208 may utilize to request joining of the virtual machine instance 208 to the managed directory 216 through the created computer account. The operating system of the virtual machine instance 208 may thus generate an API call that, when received by the directory domain controller 218, may cause the virtual machine instance 208 to be joined to the managed directory 216.

In an embodiment, the customer can enable other delegated users to access the virtual machine instance 208 and, potentially, the managed directory 216 through the virtual machine instance 208. For instance, each of these delegated users may utilize their own set of credentials from the computing resource service provider to access the virtual machine instance 208. When a delegated user utilized his/ her set of credentials to access the virtual machine instance 208, the agent 210 may utilize these credentials to transmit a request to the identity management service to determine whether the delegated user is authorized to access the managed directory 216 or not. If the delegated user is not authorized to access the managed directory 216, the agent 210 may terminate the established connection with the managed directory 216 in order to prevent unauthorized access to the managed directory 216. Alternatively, the agent 210 may disable any functionality of the virtual machine instance 208 that may be used to access the managed directory 216. For instance, the agent 210 may disable any functions within applications in the virtual machine instance 208 that may be utilized to modify, create, delete or otherwise access any data within the managed directory 216. However, if the delegated user is authorized to access the managed directory 216, the agent 210 may enable the delegated user to utilize the virtual machine instance 208 to access the managed directory 216.

Figure 3:
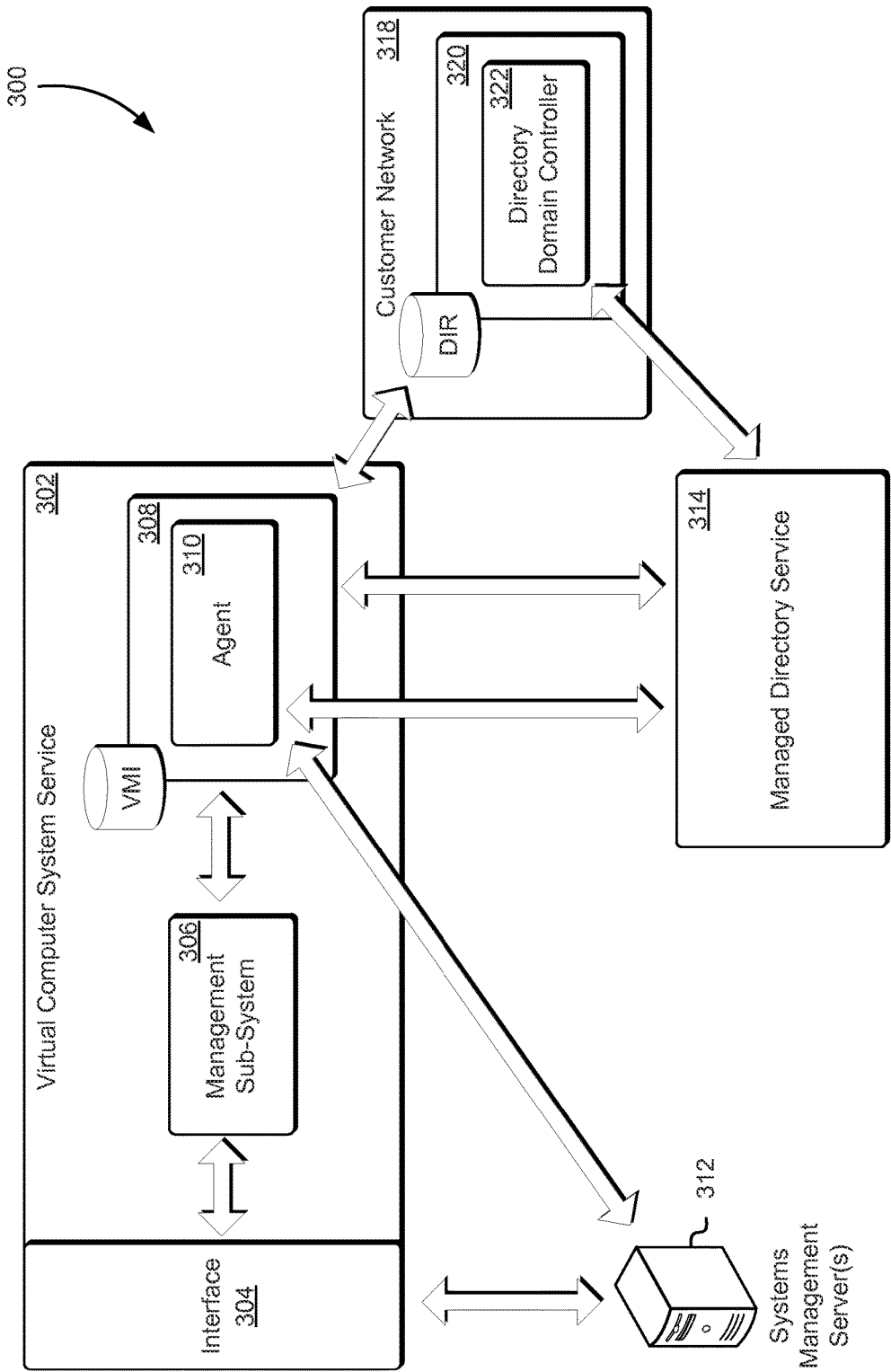
FIG. 3 shows an illustrative example of an environment in which a virtual machine instance is automatically joined to a managed directory within on-premises customer network in accordance with at least one embodiment.

As noted above, a customer may submit a request to launch a virtual machine instance and join this virtual machine instance to a managed directory within an on-premises customer network. The virtual machine instance may include an agent, which may be configured to utilize configuration information for the managed directory to access the on-premises customer network and enable joining of the virtual machine instance to the managed directory. Accordingly, FIG. 3 shows an illustrative example of an environment 300 in which a virtual machine instance 308 is automatically joined to a managed directory 320 within on-premises customer network 318 in accordance with at least one embodiment. In the environment 300, a customer may utilize an interface 304 provided by the virtual computer system service 302 to request that a virtual machine instance 308 be launched for his/her use. Similar to the interface described above in connection with FIG. 2, the interface 304 may specify that the virtual machine instance 308 to be launched is to be joined to a particular managed directory 320. In addition to selecting a managed directory maintained by the managed directory service 314, the interface 304 may enable the customer to provide configuration information for a managed directory 320 maintained within the on-premises customer network 318, as this configuration information may not be available through the managed directory service 314. When the customer provides configuration information for a managed directory 320 within the on-premises customer network 318, the interface 304 may access a systems management server 312 to update a customer entry to specify this newly received configuration information.

The management sub-system 306, upon receiving the request from the interface 304 to launch the virtual machine instance 308, may obtain the selected virtual machine image and instantiate the virtual machine image within a physical host. This virtual machine instance 308 may include an agent 310 that may be initiated when the virtual machine instance 308 is launched or when the customer accesses the virtual machine instance 308 for the first time. The agent 310 may be configured to obtain the customer's identifier and transmit a request to the systems management server 312 to determine whether the virtual machine instance 308 is to be joined to a managed directory 320 and, if so, whether the customer is authorized to join the virtual machine instance 308 is to be joined to a managed directory 320. If the customer is not authorized to join the virtual machine instance 308 to a managed directory 320, the systems management server 312 may deny the request from the agent 310, preventing the virtual machine instance 308 from being joined to the managed directory 320.

If the customer is authorized to join the virtual machine instance 308 to the managed directory 320, the systems management server 312 may provide the configuration information of the managed directory 320 to the agent 310 in response to the request from the agent 310. Subsequently, the agent 310 may utilize the configuration information to establish, through the managed directory service 314, a communications channel with the directory domain controller 322 of the managed directory 320 operating within the on-premises customer network 318. Additionally, the agent 310 may generate a temporary set of computer credentials, which the agent 310 may transmit to the directory domain controller 322 to enable the directory domain controller 322 to verify that the customer is authorized to generate a computer account within the managed directory 320. This computer account may enable the virtual machine instance 308 to be joined to the managed directory 320 within the on-premises customer network 318. Once the directory domain controller 322 has generated a computer account within the managed directory 320 in response to the agent 310 request, the agent 310 may expose an API to the operating system of the virtual machine instance 308. Subsequently, the operating system of the virtual machine instance 308 may transmit an API call using the exposed API to the directory domain controller 322 through the managed directory service 314 to join the virtual machine instance 308 to the managed directory 320.

Once the virtual machine instance 308 has been joined to the managed directory 320 within the on-premises customer network 318, the customer may utilize his/her set of credentials for accessing the virtual machine instance to also access the managed directory 320 through the virtual machine instance 308. In some embodiments, the customer may delegate authority to other users to enable these users to utilize the virtual machine instance 308 to access the managed directory 320. For instance, these users may utilize their credentials for accessing the virtual machine instance 308 to also access the managed directory 320. The customer may also enable other users to access the virtual machine instance 308 while preventing these users from accessing the managed directory 320 within the on-premises customer network. For instance, the customer may establish one or more policies for a user, which may specify that the user is not authorized to utilize the virtual machine instance 308 to access the managed directory 320. When this user utilizes his set of credentials to access the virtual machine instance 308, the agent 310 may access an identity management service and utilize the user's set of credentials to identify any policies applicable to the user. If any of these policies specify that the user is not authorized to utilize the virtual machine instance 308 to access the managed directory 320, the agent 310 may terminate the communications channel with the managed directory 320 during the user's session or otherwise disable any functionality within the virtual machine instance 308 that may enable access to the managed directory 320.

Figure 4:
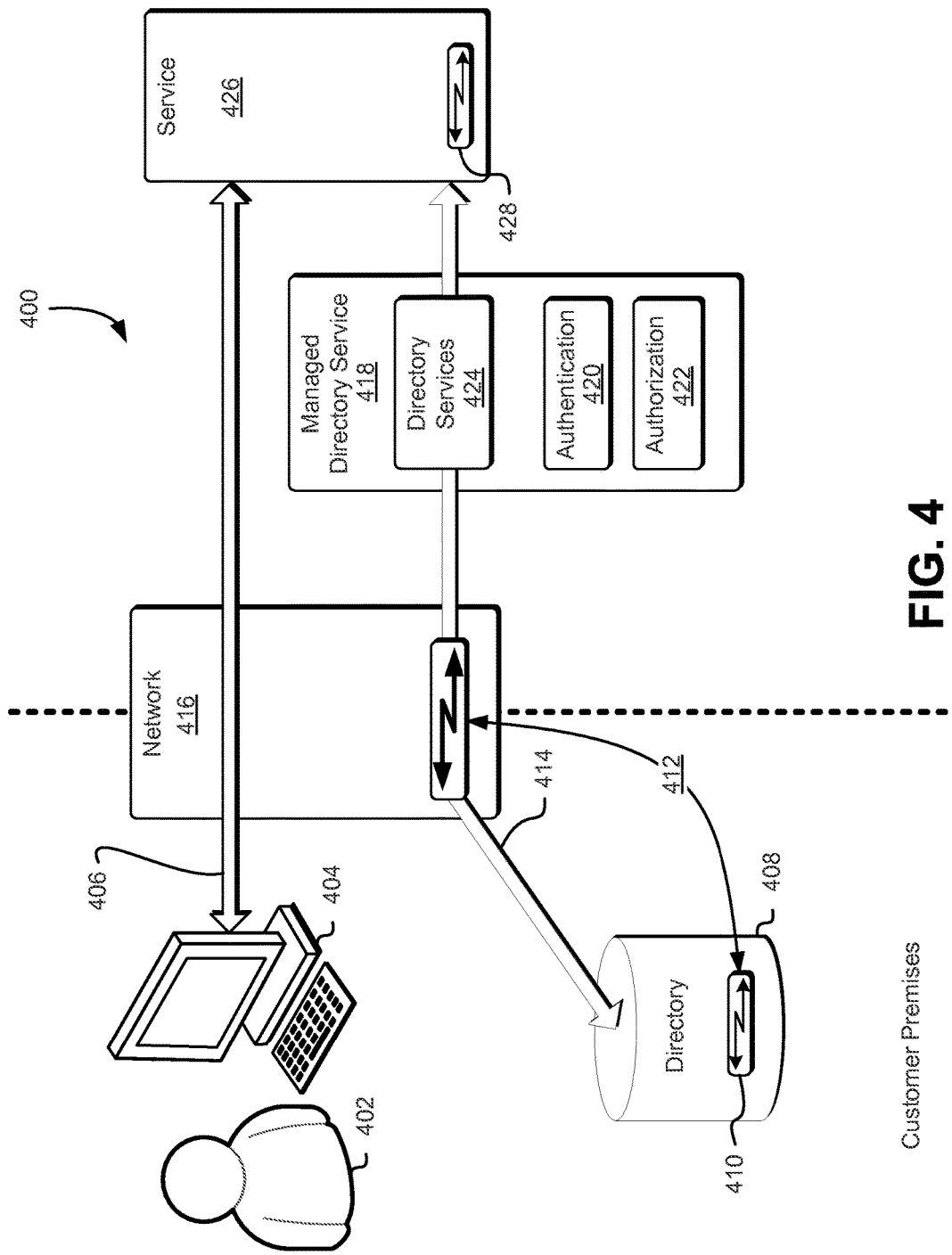
FIG. 4 shows an illustrative example of an environment in which computer system resources may be accessed by computer system entities in accordance with at least one embodiment.

As noted above, the virtual computer system service may include an interface and a management sub-system that may both be configured to communicate with a managed directory service to obtain information necessary to join a newly created virtual machine instance to a managed directory. Accordingly, FIG. 4 illustrates an environment 400 for accessing computer system directory resources including, but not limited to, computer system services such as directory services and resources such as user resources, policy resources, network resources and/or storage resources associated with the directory services, on distributed and/or virtualized computer system environments as well as the associated code running thereon in accordance with at least one embodiment. A computer system entity, user or process 402 may connect to a computer system through a computer system client device 404 and may request access via connection 406 to one or more services 426. The command or commands to request access to a service may originate from an outside computer system and/or server, or may originate from an entity, user or process on a remote network location, or may originate from the computer system, or may originate from a user of the computer system client device, or may originate as a result of a combination of these and/or other such objects. The command or commands to request access to a service may, in some embodiments, be issued by a privileged user, or by an unprivileged user, or by an autonomous process, or as a result of an alarm or condition or by a combination of these and/or other methods.

The computer system client device may request access to services via one or more networks 416 and/or entities associated therewith, such as other servers connected to the network, either directly or indirectly. The computer system client device may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others.

In some embodiments, the computer system may include one or more local computer system resources 408 which may be located at least in part on the customer premises (e.g., on-premises) and which may store files and/or other computer system resources thereon including, but not limited to, directories, applications, data, databases, links to other computer system resources, system drivers, computer operating systems, virtual machines and/or other such resources. In some embodiments, the local computer system resources may be local file system resources and may be stored on a variety of storage devices such as system random access memory (RAM), disk drives, solid state drives, removable drives or combinations of these and/or other such storage devices. In some embodiments, the local computer system resources may be located at least in part in a datacenter (a plurality of computer system resources, services and/or storage devices that may be collocated) that may be accessed by the computer system client device via one or more connections such as, for example, the network connections described herein. The computer system resources and/or the datacenter may be located locally or a combination of locally and remotely. For example, in some embodiments, a file system and/or directory may be located on a disk located in a local datacenter and the contents of the file system and/or directory may also be replicated to a disk located in a remote datacenter. In some other embodiments, a file system and/or directory may have at least a part of its contents located in one datacenter that may be local, and other parts of its contents located in one or more other datacenters that may be local or remote. The storage devices may include physical devices such as those described herein and/or virtual representations of such physical devices. For example, a file system and/or directory storage device may include some amount of physical memory, part of which is dedicated to storage as a virtual disk drive with a file system created on the virtual disk drive. Other such local storage devices may be considered as within the scope of this disclosure.

In some embodiments, the service 426 may need access to one or more computer system directory resources such as those described herein. The service 426 may, in some embodiments, include a variety of other computer system entities including, but not limited to, users, other computer systems, processes and/or automated processes and/or other such computer system entities. Access 414 to the system directory resources may, in some embodiments, be provided by a service such as a managed directory service 418, which may provide access to one or more system resources. The managed directory service may provide a variety of services to enable computer systems and/or computer system client devices to access system resources including, but not limited to, 420 authentication, 422 authorization and 424 directory services.

For example, the managed directory service may provide 420 authentication services which may authenticate credentials of a user, computer system, process, automated process or other such entity to at least determine whether that entity is authorized to access the managed directory service and/or the system resources associated with the managed directory service. In some embodiments, the credentials may be authenticated by the managed directory service itself, or they may be authenticated by a process, program or service under the control of the managed directory service, or they may be authenticated by a process, program or service that the managed directory service may communicate with, or they may be authenticated by, a combination of these and/or other such services or entities.

The managed directory service may also provide 422 authorization services which may authorize a user, computer system, process, automated process or other such entity to at least determine which actions of one or more possible actions that entity may perform. For example, in the case of a computer system resource such as a file system resource, actions that an entity may or may not be authorized to perform include, but are not limited to, creating file systems on the file system resource, destroying file systems on the file system resource, attaching to file systems on the file system resource, detaching from file systems on the file system resource, providing access links to file systems on the file system resource, reclaiming access links to file systems on the file system resource, allowing reads from file systems on the file system resource, allowing writes to file systems on the file system resource and/or other such file system resource actions.

Actions on system resources may include, but not be limited to, actions on directories, files, applications, data, databases, links to other resources, system drivers, operating systems, virtual machines and/or other such system resource objects thereon and may include such actions as the actions mentioned herein. Actions to start, stop, reclaim, destroy and/or otherwise manage the system resources as well as other such actions may also be included in the available actions. Authorization to perform actions may be managed by an entity such as a credentialing or policy system such as a system that, for example, maintains a set of credentials and/or policies related to a certain entity and may determine, based at least in part on the set of credentials and/or policies which actions an entity is authorized to perform. The actions that an entity may be authorized to perform may be static or may vary according to a number of factors including, but not limited to, time of day, type of credentials, system policies, nature, type or location of the object being accessed or a combination of these and/or other such authorization factors. For example, a computer system entity may be authorized only to read certain files on a file system, to read and write certain other files on a file system, and to add and delete certain other files on a file system. A different computer system entity may be authorized to perform any actions on the file system, but only if those actions are initiated from a certain location and at a certain time. One or more processes may be authorized only to write to a file on a file system, such as, for example, a system log, while other processes may only be authorized to read from the file. As may be contemplated, these are illustrative examples. Other types of operations may be authorized by the managed directory service authorization system and such other types of operations are also considered as being within the scope of the present disclosure.

The managed directory service may also provide 424 directory services which may provide an authenticated entity access 414 to computer system resources according to the authorization credentials and/or policies. For example, in an embodiment where a computer system entity may be authorized to read and write a certain data store on a computer system resource such as a file system resource, the ability to do so may be provided by the directory services. Directory services may provide access to the file system resource by providing links to the file system resource locations such as by a URI object or some other such linkage. The URI may be provided by the computer system client device, or by a process running at the data center, or by a process running on a computer system connected to the datacenter, or by the managed directory service or by a combination of these and/or other such computer system entities.

In some embodiments, the access to the computer system resources may be provided in such a way that the access is invisible to the requesting entity. For example, the access 414 may be provided to a requesting entity as a URI or other such link to a location 410 on the local file system 408. The location on the computer system resource may be 412 translated into a URI by one or more processes running on the computer system. The service or entity 426 that requested the access to the computer system resource may use the 428 received URI to access the computer system resource without requiring configuration that is dependent on the location of the computer system resource and may, in some embodiments, use the URI to link to the computer system resource to operate as if the service or entity 426 were directly connected to the computer system resource. Operations that, for example, appear to write a set of data to a file that may appear to the service or entity to be located in a location local to the service or entity, may actually package the data into a network packet and may then transfer the packet over the network 416 via the access link 414, to be actually written to a file located on local file system 408. As may be contemplated, these are illustrative examples and other types of operations which may be performed by the managed directory service may also be considered as within the scope of the present disclosure.

Figure 5:
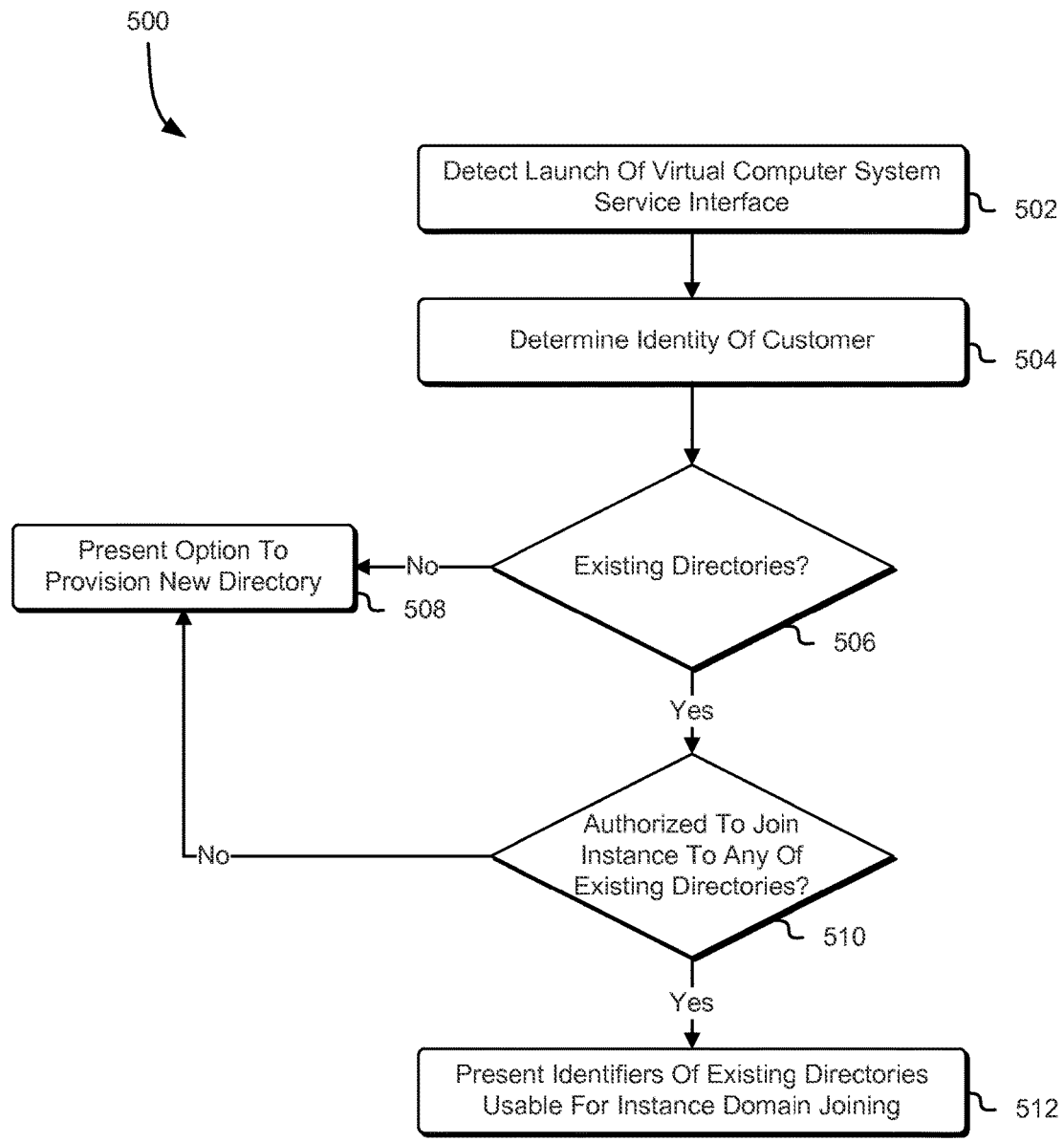
FIG. 5 shows an illustrative example of a process for enabling customers to select a managed directory to enable domain join of a virtual machine instance to be launched in accordance with at least one embodiment.

As noted above, a customer may utilize an interface provided by the virtual computer system service to create a virtual machine instance and specify a customer directory that is to be used to join the virtual machine instance. However, if no customer directories are available, the customer may be presented with the option to additionally create a new customer directory and join the virtual machine instance to this new customer directory. Accordingly, FIG. 5 shows an illustrative example of a process 500 for enabling customers to select a managed directory to enable domain join of a virtual machine instance to be launched in accordance with at least one embodiment. The process 500 may be performed by a virtual or other computer system service in connection with an interface configured to receive customer requests and transmit a request for customer directories and, in some embodiments, one or more API calls to a managed directory service. Accordingly, the managed directory service may be configured to perform some of the actions provided in the process 500.

A customer may access the virtual computer system service through an interface by utilizing a set of credentials provided to the customer by the computing resource service provider. When the customer initially accesses the virtual computer system service through use of the interface, the virtual computer system service may detect 502 that the customer has launched an interface which may be used to launch a new virtual machine instance. Through this interface, the customer may also specify that this virtual machine instance should be joined to a new or existing customer directory. The customer may utilize the interface to specify the operating system and applications that are to be included in the virtual machine instance, as well as the computing resources that should be used to instantiate the virtual machine instance. Alternatively, the customer may select a virtual machine image that includes an operating system and pre-loaded applications. This virtual machine image may also be used to instantiate the virtual machine instance.

In order to determine whether the customer has the authorization to join this virtual machine instance to an existing customer directory, the interface may be configured to transmit the received set of credentials to an identity management service to determine 504 the identity of the customer. For instance, the identity management service may include a customer profile which may include one or more policies that may affect this particular customer. For example, the customer may only be authorized to create a virtual machine instance but may not have access to a managed directory service or other service provided by the computing resource service provider. If the customer does not have access to these services, the interface may not include any options for utilizing the virtual machine instance to interact with these services. Alternatively, the identity management service may include additional customer credentials that may be used to access these additional services. The interface may obtain the customer identification and credentials utilized to access a managed directory service in order to determine the customer's level of access within the managed directory service.

The interface may subsequently transmit a request, as well as the customer identity and credentials, to a managed directory service to determine whether there are any existing customer directories available to the customer that may be used to join the new virtual machine instance. In some embodiments, if the virtual computer system service is configured to communicate through one or more API calls to the managed directory service, the interface may additionally request the FQDN and DNS IP addresses for each of the existing customer directories that may be used. However, in an embodiment, if the virtual computer system service is not configured to obtain the FQDN and DNS IP addresses for each of the existing customer directories, the interface may only request the identification of each of the existing customer directories. In some embodiments, the managed directory service may only provide information regarding existing customer directories maintained by the managed directory service. Thus, any managed directories maintained within an on-premises customer network may not be included in the determination of existing customer directories available to the customer through the managed directory service. In some alternative embodiments, the managed directory service may maintain information regarding these managed directories within the on-premises customer network, enabling the managed directory service to determine whether these directories are available to the customer.

Thus, the managed directory service may process the request from the interface provided by the virtual computer system service to determine 506 if the customer has any existing managed directories. If the customer does not have any existing managed directories that may be used to join the new virtual machine instance, the managed directory service may transmit a null set of managed directory identifiers to the interface. Thus, if the interface receives, from the managed directory service, a null set of managed directory identifiers, the interface may present 508 the customer with the option to provision a new managed directory through the managed directory service. If the managed directory service does not have visibility into any managed directories within an on-premises customer network, the interface may further enable the customer to manually provide the configuration information (e.g., FQDN and DNS IP addresses) for a managed directory within the on-premises customer network. For instance, the interface may include one or more entry fields that may enable the customer to provide an identifier and corresponding configuration information for an on-premises customer network managed directory. These one or more entry fields may be available to the customer through the interface regardless of whether the managed directory service provides a null set of managed directory identifiers or a set of identifiers corresponding to existing managed directories available to the customer.

If the customer does have one or more existing customer directories available through the managed directory service, the managed directory service may determine 510 whether the customer is authorized to utilize any of the existing customer directories to join the new virtual machine instance. For instance, the managed directory service may utilize the received customer credentials to refer to a customer profile and the policies set forth in each of the customer directories to determine the level of access the customer has to these directories. Alternatively, the managed directory service may access an identity management service and utilize the customer credentials to identify any policies that may be applicable to the customer and the managed directories. As an example, the customer may have previously specified that a particular customer directory can never be attached to a virtual machine instance due to certain security concerns. Thus, if the managed directory service determines that the customer is not authorized to utilize any of the existing customer directories maintained by the managed directory service to join the new virtual machine instance, the managed directory service may transmit a null set of identifiers to the interface, causing the interface to present 508 the customer with an option to create a new customer directory.

If one or more existing customer directories are available, and the customer is permitted to join the virtual machine instance to any of these existing customer directories, the managed directory service may transmit the list of these customer directories to the interface. Additionally, in some embodiments, the managed directory service may additionally transmit the FQDN and DNS IP addresses for each of these customer directories to the interface. Thus, the interface may receive the set of identifiers of these available managed directories from the managed directory service and present 512 these identifiers of the existing directories available for joining the new virtual machine instance to the customer. In this manner, the customer may not only specify the parameters for the new virtual machine instance but also identify a customer directory that may be used to join the virtual machine instance.

Figure 6:
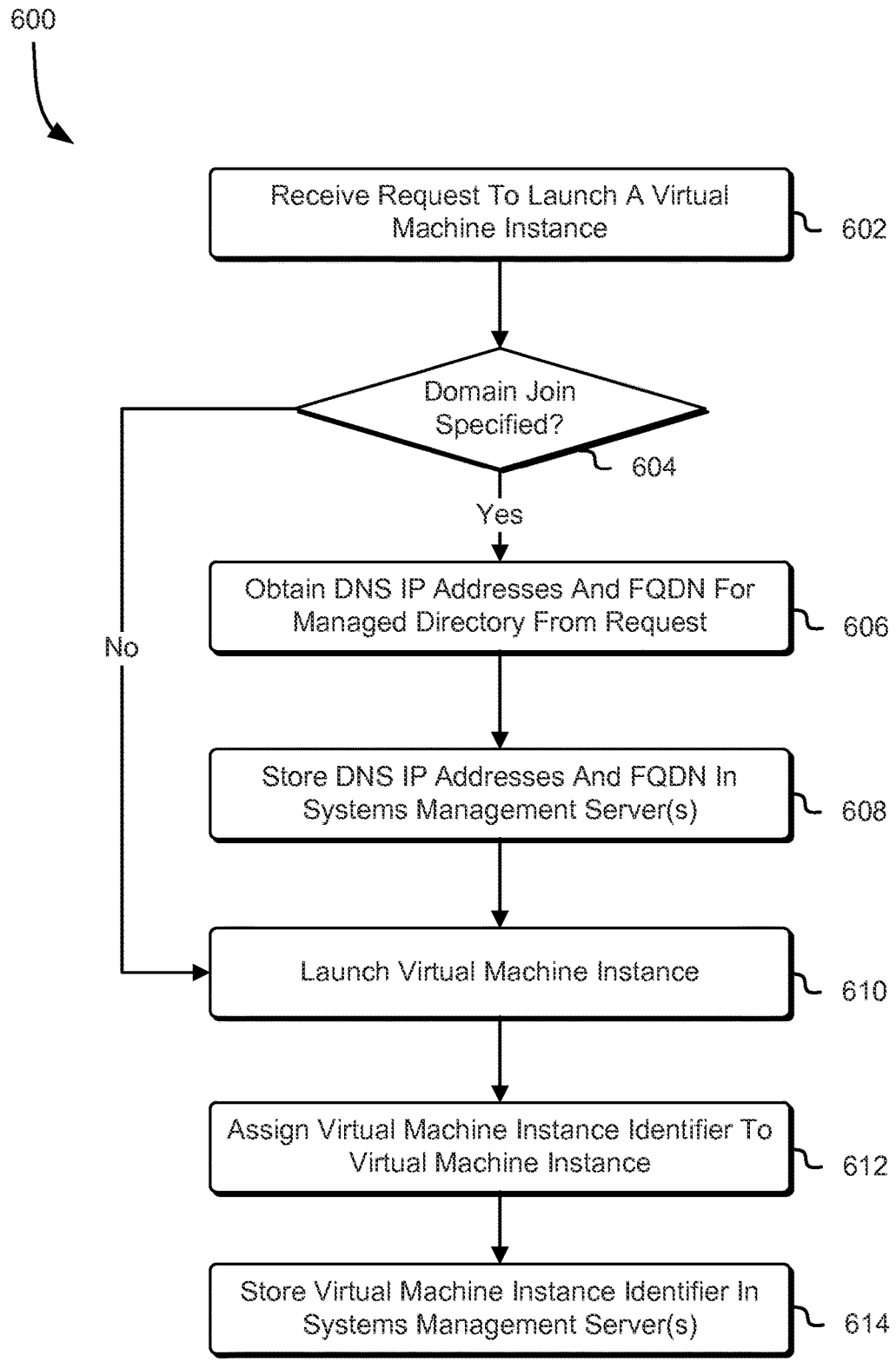
FIG. 6 shows an illustrative example of a process for launching a virtual machine instance and storing managed directory information based at least in part on a request specifying domain join of the virtual machine instance to the managed directory in accordance with at least one embodiment.

As noted above, the virtual computer system service, through an interface, may receive a request from a customer to launch a virtual machine instance and join this newly launched virtual machine instance to a new or existing managed directory. For instance, a customer, through the interface, may select an identifier for a managed directory maintained by a managed directory service or may provide configuration information for a managed directory within an on-premises customer network to specify that the virtual machine instance is to be joined to a particular managed directory. Accordingly, FIG. 6 shows an illustrative example of a process 600 for launching a virtual machine instance and storing managed directory information based at least in part on a request specifying domain join of the virtual machine instance to the managed directory in accordance with at least one embodiment. The process 600 may be performed by the aforementioned virtual computer system service, which may be configured to receive customer requests from an interface and utilize the information included in these requests to launch virtual machine instances on behalf of the customer. Additionally, the virtual computer system service may be configured to interact with a systems management server to store configuration information of the selected managed directory for later use by the agent within the virtual machine instance.

When a customer utilizes the interface provided by the virtual computer system service to launch a virtual machine instance, the customer may further specify that the virtual machine instance should be joined to a particular managed directory. For instance, as described above in connection with FIG. 5, the interface may be configured to provide a customer with identifiers for each managed directory maintained by the managed directory service that may be used for domain joining. Alternatively, through the interface, the customer may specify the configuration information for a managed directory within an on-premises customer network for domain joining. Through the interface, the customer may specify what kind of virtual machine instance is to be launched. For instance, the customer may select a virtual machine image comprising an operating system and various applications that may be suited for the customer's needs. This virtual machine image may be instantiated onto a physical host, which will be described in greater detail below. Thus, the virtual computer system service may receive 602 a request to launch a virtual machine instance.

The virtual computer system service may evaluate this received request to launch a virtual machine instance to determine 604 whether the customer has specified that the virtual machine instance should be joined to a managed directory, either maintained by the managed directory service or operating within an on-premises customer network. For instance, if the customer has specified that the virtual machine instance is not to be joined to a managed directory, the virtual computer system service may access a virtual machine image data store, obtain the selected virtual machine image, and instantiate the selected virtual machine image onto a physical host to launch 610 the virtual machine instance. This may enable the customer to access the virtual machine instance without access to any managed directories.

If the customer has specified, through the request to launch a virtual machine image, that the virtual machine image is to be joined to a particular managed directory, the virtual computer system service may obtain 606 the DNS IP addresses and FQDN for the existing managed directory from the request. For instance, if the specified managed directory is maintained by a managed directory service, the virtual computer system service may have received this configuration information (e.g., DNS IP addresses and FQDN) from the managed directory service in response to a request to identify any managed directories available to the customer. When a customer selects, through the interface, an identifier for a managed directory maintained by a managed directory service, the interface may append the request to launch the virtual machine instance to include the configuration information for the selected managed directory. Alternatively, the customer may provide the configuration information for a managed directory within an on-premises customer network directly through the interface. For instance, the customer may input, into one or more input fields within the interface, the configuration information for a particular managed directory.

Once the virtual computer system service has obtained the DNS IP addresses and the FQDN for the managed directory from the request, the virtual computer system service may store 608 this configuration information within one or more systems management servers. As noted above, these one or more systems management servers may include a database comprising an entry for each customer of the computing resource service provider. The virtual computer system service may transmit a request to the one or more systems management servers to locate the particular customer entry (e.g., identifier of the customer provided by the computing resource service provider) and modify the entry to specify the configuration information of the managed directory used to join the virtual machine instance to be launched. The customer entry may also be modified to include an identifier for the managed directory and an identifier for the virtual machine instance. This may enable an agent operating within the virtual machine instance to locate this customer entry and identify the appropriate configuration information for the managed directory.

Upon storing the configuration information of the selected managed directory within the one or more systems management servers, the virtual computer system service may launch 610 the virtual machine instance. For instance, the virtual computer system service may obtain a corresponding virtual machine image comprising the required operating system and applications as specified by the customer from a virtual machine image data store and instantiate this virtual machine image onto a physical host. By instantiating the virtual machine image onto a physical host, the virtual computer system service may launch the virtual machine instance and make it available to the customer for his/her use. Additionally, the launch of the virtual machine instance may cause an agent to initiate operations within the virtual machine instance. As will be described in greater detail below, this agent may be configured to obtain the configuration information for the managed directory from the one or more systems management servers to join the virtual machine instance to the managed directory. The virtual computer system service, upon launching of the virtual machine instance, may assign 612 a virtual machine instance identifier to the instance and store 614 this identifier within the one or more systems management servers for later use. This may enable the agent to identify the appropriate managed directory configuration information from the one or more systems management servers for the domain join process.

Figure 7:
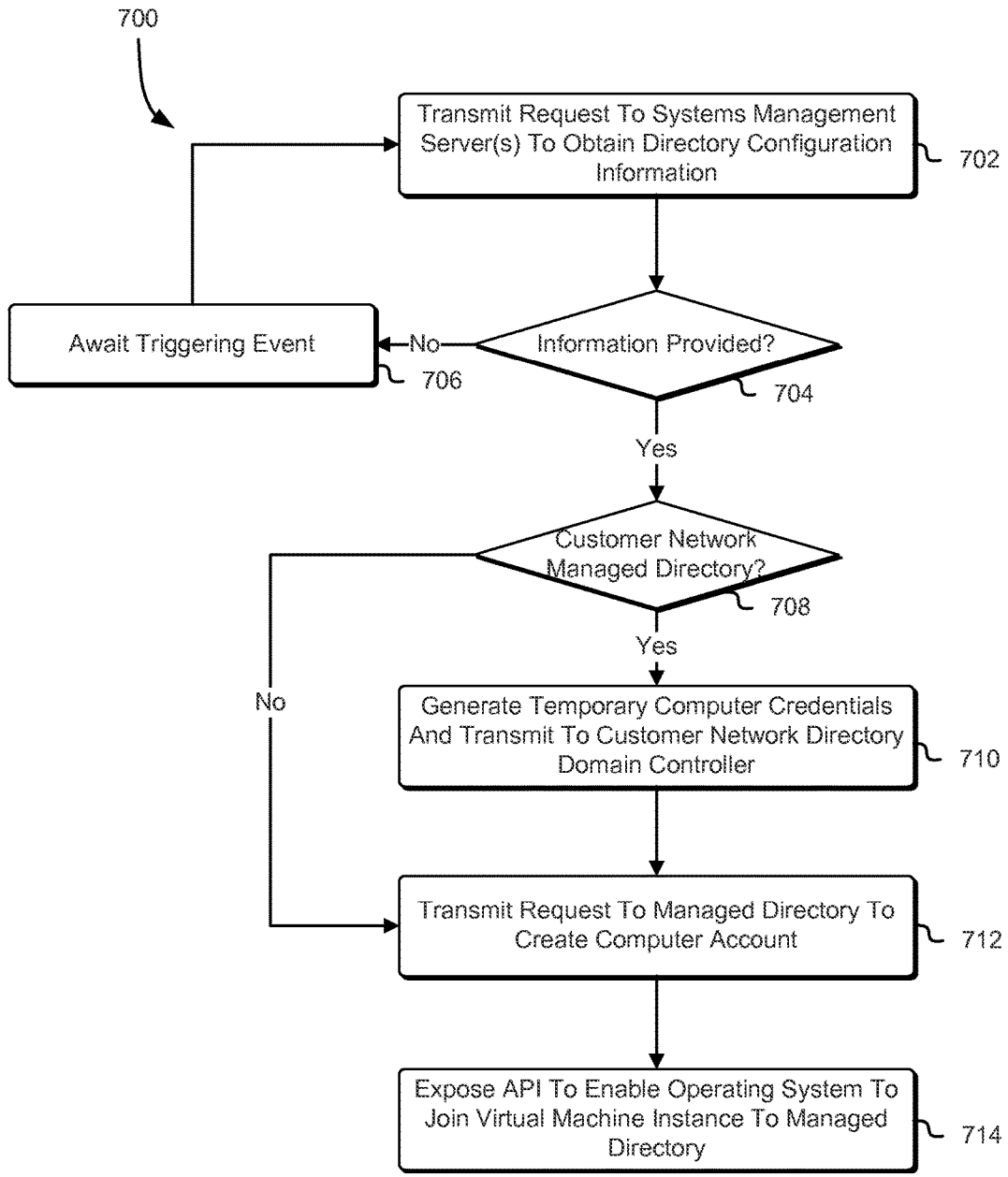
FIG. 7 shows an illustrative example of a process for obtaining managed directory configuration information and utilizing the managed directory configuration information to join a virtual machine instance to a specified managed directory in accordance with at least one embodiment.

As noted above, the virtual machine instance may include an agent that may be launched when the virtual machine image is instantiated onto a physical host, launching the virtual machine instance. This agent may be configured to obtain configuration information for a managed directory that the virtual machine instance is to be joined to and, using this information, join the virtual machine instance to the managed directory. Accordingly, FIG. 7 shows an illustrative example of a process 700 for obtaining managed directory configuration information and utilizing the managed directory configuration information to join a virtual machine instance to a specified managed directory in accordance with at least one embodiment. The process 700 may be performed by the aforementioned agent, which may be configured to interact with one or more systems management servers to obtain the configuration information necessary to join the virtual machine instance to the selected managed directory. Further, the agent may be configured to access a managed directory service and/or an on-premises customer network to establish a communications channel with the selected managed directory and join the virtual machine instance to this managed directory.

When the agent is first initiated within the virtual machine instance upon the virtual machine instance having been launched, the agent may transmit 702 a request to the one or more systems management servers to obtain any managed directory configuration information corresponding to the virtual machine instance and the customer for whom the instance has been launched. For instance, the agent may obtain a customer identifier of the customer when he/she first accesses the virtual machine instance. This identifier may be used to identify any customer entries within the one or more systems management servers that may specify configuration information for a managed directory selected by the customer when he/she submitted a request to launch the virtual machine instance. Thus, the request may specify the customer identifier and an identifier for the particular virtual machine instance, which may enable the one or more systems management servers to find the requested configuration information.

When the one or more systems management servers receive the request from the agent, the one or more systems management servers may access an identity management service provided by the computing resource service provider to determine whether the customer is authorized to join the virtual machine instance to a managed directory. If, through the identity management service, the one or more systems management servers determine that the customer is not authorized to join the virtual machine instance to a managed directory, the one or more systems management servers may deny the agent's request for configuration information. However, if the customer is authorized to join the virtual machine instance to a managed directory, the one or more systems management servers may utilize the provided customer identifier and virtual machine instance identifier to locate a customer entry and determine whether configuration information for a particular managed directory has been provided for the particular virtual machine instance. If the configuration information for a managed directory has been provided, the one or more systems management servers may respond to the agent's request by providing this information. Thus, based at least in part on the response from the one or more systems management servers, the agent may determine 704 whether configuration information for a managed directory has been provided by the one or more systems management servers.

If the one or more systems management servers have not provided configuration information for a particular managed directory, the agent may await 706 a triggering event before transmitting 702 a new request to obtain any available configuration information for a managed directory. For instance, if the customer was previously not authorized to join a virtual machine instance to a managed directory, the agent may receive a notification from the identity management service of a change to the customer's policies. If these policies specify that the customer is now authorized to join a virtual machine instance to a managed directory, the agent may transmit 702 a new request to the one or more systems management servers to obtain any available directory configuration information. Additionally, or alternatively, the agent may be configured to interact with the one or more systems management servers after a particular period of time (e.g., ten minutes, an hour, a day, etc.) has passed if no configuration information has been received. In some embodiments, even if the agent has received configuration information for a managed directory from the one or more systems management servers, the agent may transmit 702 additional requests to the one or more systems management servers to obtain directory configuration information for any other managed directories which the customer has specified should be accessible through the virtual machine instance.

Once the agent has received configuration information for a managed directory from the one or more systems management servers, the agent may determine 708 whether the configuration information is for a managed directory within an on-premises customer network. As noted above, the configuration information may include DNS IP addresses and a FQDN for a particular managed directory. Using this information, the agent may determine whether the managed directory is maintained by a managed directory service or is maintained within an on-premises customer network. For example, if a portion of the FQDN corresponds to the managed directory service or the computing resource service provider, then the agent may determine that the managed directory is not maintained within an external customer network.

As noted above, if a managed directory is maintained within an on-premises customer network, the agent may generate 710 a temporary set of computer credentials that may be utilized by a customer network directory domain controller to verify that the customer is authorized to access the managed directory. The agent may utilize the directory configuration information to transmit a request to the managed directory service to provide a network interface that may be utilized to establish a communications channel from the agent, through the network interface, to the directory domain controller within the on-premises customer network. Subsequently, the agent may transmit this temporary set of computer credentials to the directory domain controller.

Once the agent has provided the temporary set of computer credentials to the directory domain controller within the on-premises customer network or the managed directory is maintained within the managed directory service, the agent may transmit 712 a request to the directory domain controller of the managed directory to create a computer account. This computer account may correspond to the virtual machine instance and may enable the virtual machine instance to be joined to the particular managed directory. For instance, if the managed directory is maintained by a managed directory service, the directory domain controller may receive the request, which may include the customer identifier and the virtual machine instance identifier, and determine whether the customer is authorized to join the virtual machine instance to the managed directory. Subsequently, the directory domain controller may access the identity management service to determine whether the customer is authorized to do so. If so, the directory domain controller may create the computer account within the directory. Alternatively, if the managed directory is maintained within an on-premises customer network, the directory domain controller may utilize the temporary set of computer credentials to determine whether the customer is authorized to join the virtual machine instance to the managed directory. If the temporary set of computer credentials is valid, the directory domain controller may create the computer account.

As a result of the directory domain controller within the managed directory having created the computer account in response to the agent request, the agent may expose 714 an API that may be utilized by the operating system of the virtual machine instance to request a domain join of the virtual machine instance to the managed directory. For instance, the operating system may utilize the API to transmit an API call to the directory domain controller of the managed directory to join the virtual machine instance to the managed directory. Subsequently, the directory domain controller may cause the set of temporary credentials to expire and discard these credentials. The domain join may enable the customer or other delegated users to access the managed directory through use of the virtual machine instance. For instance, the customer may utilize his computing resource service provider credentials to access the virtual machine instance and the managed directory. Additionally, if the customer so desires, he/she may delegate access to the virtual machine instance to other users. This may enable these delegated users to utilize their own computing resource service provider credentials to access the virtual machine instance and the managed directory. In some embodiments, the customer may enact one or more policies for a delegated user and specify that while the delegated user may access the virtual machine instance, the delegated user may not access the managed directory. Thus, when the delegated user utilizes his/her set of credentials to access the virtual machine instance, the agent may access the identity management service and utilize this set of credentials to determine whether the delegated user is authorized to access the managed directory. If the user is not authorized to access the managed directory, the agent may disable any functionality of the virtual machine instance that may enable the user to access the managed directory.

Figure 8:
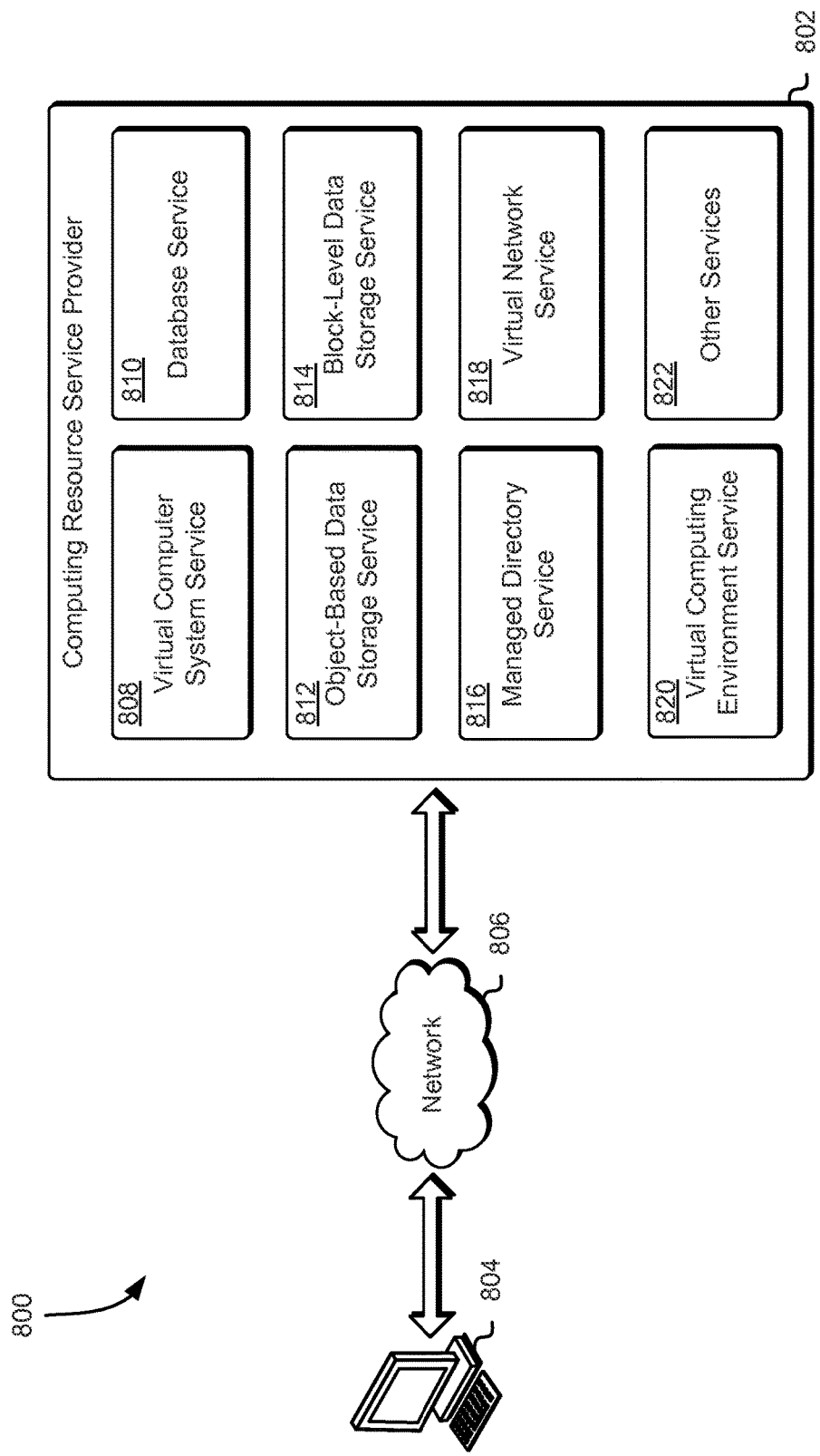
FIG. 8 shows an illustrative example of an environment which various embodiments can be implemented.

FIG. 8 shows an illustrative example of an environment 800 in which various embodiments can be implemented. In the environment 800, a computing resource service provider 802 may provide a variety of services to a customer 804 or other users. The customer 804 may be an organization that may utilize the various services provided by the computing resource service provider 802 to remotely generate and maintain one or more resources and provide a mapping of user roles for use within a customer network to enable management of one or more delegated access permissions to define a level of access for users of his or her resources. As illustrated in FIG. 8, the customer 804 may communicate with the computing resource service provider 802 through one or more communications networks 806, such as the Internet. Some communications from the customer 804 to the computing resource service provider 802 may cause the computing resource service provider 802 to operate in accordance with various techniques described herein or variations thereof.

As noted above, a computing resource service provider 802 may provide various computing resource services to its customers. For instance, in this particular illustrative example, the computing resource service provider 802 provides at least seven types of services. The services provided by the computing resource service provider, in this example, include a virtual computer system service 808, a database service 810, an object-based data storage service 812, a block-level data storage service 814, a managed directory service 816, a virtual network service 818, a virtual computing environment service 820 and one or more other services 822, although not all embodiments of the present disclosure will include all such services and additional services may be provided in addition to or as an alternative to services explicitly described herein.

The virtual computer system service 808 may be a collection of computing resources configured to instantiate virtual machine instances onto virtual computer systems on behalf of the customers 804 of the computing resource service provider 802. Customers 804 of the computing resource service provider 802 may interact with the virtual computer system service 808 to provision and operate virtual computer systems that are instantiated on physical computing devices hosted (e.g., physical hosts) and operated by the computing resource service provider 802. The virtual computer systems may be used for various purposes, such as to operate as servers supporting a website. Other applications for the virtual computer systems may be to support database applications, electronic commerce applications, business applications and/or other applications.

The object-based data storage service 812 may comprise a collection of computing resources that collectively operate to store data for a customer 804. The data stored in the data storage service 812 may be organized into data objects. The data objects may have arbitrary sizes except, perhaps, for certain constraints on size. Thus, the object-based data storage service 812 may store numerous data objects of varying sizes. The object-based data storage service 812 may operate as a key value store that associates data objects with identifiers of the data objects which may be used by the customer to retrieve or perform other operations in connection with the data objects stored by the object-based data storage service 812. Access to the object-based data storage service 812 may be through appropriately configured API calls.

The block-level data storage service 814 may comprise a collection of computing resources that collectively operate to store data for a customer. For instance, the block-level data storage system may be configured to provide block-level data storage volumes for use with a virtual machine instance, as noted above. A customer may interact with the block-level data storage service 814 to provision a block-level data storage volume that, in turn, may be mounted as a storage device (e.g., hard drive) onto a virtual machine instance. The storage volume may be configured to behave like a raw, unformatted block storage device with a block level customer interface. Accordingly, a customer, through properly configured API calls to the service, may create a file system on top of the block-level data storage volumes or utilize the volume as a block-level storage device (e.g., a hard drive).

The managed directory service 816 may provide a variety of services to enable computer systems and/or computer system client devices to access customer directories including, but not limited to, authentication, authorization and directory services. For example, the managed directory service 816 may provide authentication services which may authenticate credentials of a user, computer system, process, automated process or other such entity to at least determine whether that entity is authorized to access the managed directory service 816 and/or the customer directories associated with the managed directory service 816. In some embodiments, the credentials may be authenticated by the managed directory service 816 itself, or they may be authenticated by a process, program or service under the control of the managed directory service 816, or they may be authenticated by a process, program or service that the managed directory service 816 may communicate with, or they may be authenticated by a combination of these and/or other such services or entities.

The managed directory service 816 may also provide authorization services which may authorize a user, computer system, process, automated process or other such entity to at least determine which actions of one or more possible actions that entity may perform. Examples of actions that an entity may or may not be authorized to perform include, but are not limited to, creating directories on the customer directory, destroying directories on the customer directory, attaching to directories on the customer directory, detaching from directories on the customer directory, providing access links to directories on the customer directory, reclaiming access links to directories on the customer directory, allowing reads from directories on the customer directory, allowing writes to directories on the customer directory and/or other such actions.

The managed directory service 816 may also provide directory services which may provide an authenticated entity access to the customer directories according to the authorization credentials and/or policies. For example, in an embodiment where a computer system entity may be authorized to read and write a certain data store on a customer directory, the ability to do so may be provided by the directory services. Directory services may provide access to customer directories by providing links to the customer directory locations such as by a URI object or some other such linkage. As may be contemplated, the URI may be provided by the computer system client device, or by a process running at the data center, or by a process running on a computer system connected to the data center, or by the managed directory service 816, or by a combination of these and/or other such computer system entities.

The virtual network service 818 may enable customers to provision a logically isolated virtual network within the computing resource service provider 802 environment. Within this isolated virtual network, a customer 804 may be able to define a range of IP addresses for various computing resources and configure network gateways and virtual network interfaces to enable public communications with these computing resources. Through the virtual network service 818, a customer 804 may be able to create a network connection between his/her on-premises network and the virtual network, such that the computing resources within the computing resource service provider 802 environment may be able to access computing resources located within the customer's on-premises network.

The virtual computing environment service 820 may allow customers 804 to interact, through the interface, with one or more virtual computing environments. For instance, the virtual computing environment service 820 may enable customers 804 to remotely manage and maintain one or more virtual machine images. These virtual machine images may be maintained in data storage within a virtual machine image data store. When a customer 804 submits a request for provisioning a virtual machine instance, the virtual computing environment service 820 may identify the machine image the customer 804 has requested and allocate the resources necessary (e.g., the processors and random-access memory (RAM) required to operate the components of the machine image) to process the machine image. The machine image may be instantiated on one or more physical storage devices (e.g., one or more servers or hard drives) that may act as a physical host for the instance. The virtual computing environment may be configured to communicate with one or more managed directories through the managed directory service 816 or through a directory domain controller within the customer's 804 on-premises network.

Figure 9:
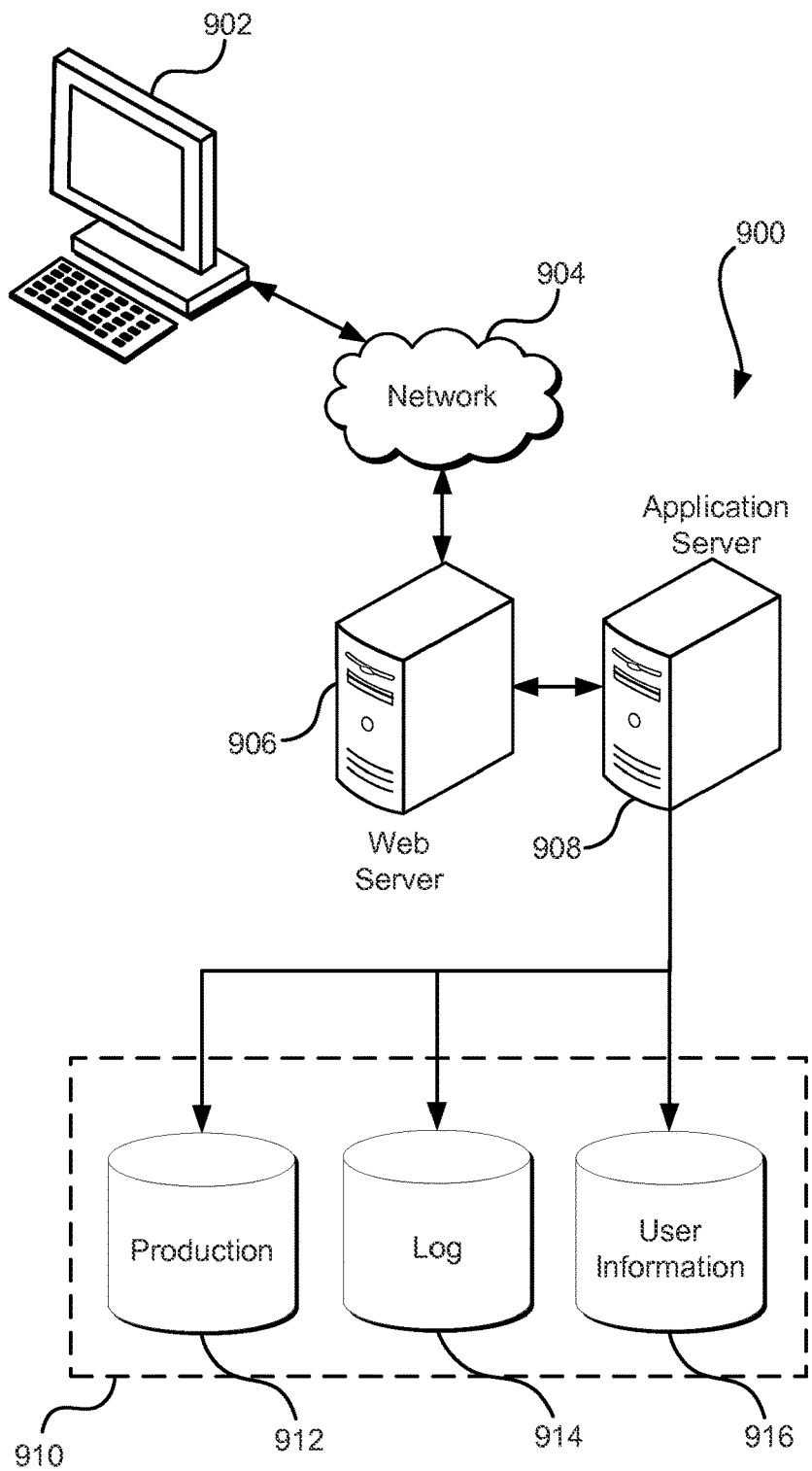
FIG. 9 shows an illustrative example of an environment which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, at a computing resource service provider separate from a requesting device, a request from a user associated with the requesting device to launch a virtual machine instance to be joined to a directory, the directory including a directory domain controller;
processing, by the computing resource service provider, the request to determine configuration information associated with the directory;
storing, by the computing resource service provider, the configuration information;
obtaining, at the computing resource service provider, a temporary set of credentials generated by launching the virtual machine instance;
authenticating, by the directory domain controller, that the user is authorized to join the directory based on the temporary set of credentials;
transmitting, by the computing resource service provider, a command to the directory domain controller to create a computer account corresponding to the directory; and
causing, by the directory domain controller, the virtual machine instance to join the directory based at least in part on the configuration information and authentication of the temporary set of credentials generated by the virtual machine instances.

2. The computer-implemented method of claim 1, wherein causing the virtual machine instance to join the directory based at least in part on the configuration information further comprises transmitting a second request to a managed directory service to establish a communications channel between the virtual machine instance and the directory domain controller of the directory.

3. The computer-implemented method of claim 1, further comprising:
  receiving, at the computing resource service provider, a second request to access the virtual machine instance, the second request to access the virtual machine instance including a set of credentials for a user;
  determining the set of credentials for the user are valid;
  evaluating one or more policies to determine whether the user is authorized to access the directory; and
  as a result of a determination that the user is not authorized to access the directory, disabling functionality of the virtual machine instance to prevent the user from using the virtual machine instance to access the directory.

4. The method of claim 1, wherein the computer-implemented method further comprises obtaining, by the computing resource service provider, a location of a file system associated with the directory, the location of the file system providing a set of computer resources used to operate the virtual machine instance joined to the directory.

5. A computer system, comprising:
  one or more processors; and
  memory storing therein instructions that, as a result of being executed by the one or more processors, cause the computer system to:
    receive, from a user of a computing device separate from the computer system, a request to launch and join a virtual machine instance to a directory, the directory managed by a directory domain controller;
    process, by the computer system, the request by at least obtaining configuration information associated with the directory;
    store the configuration information in association with the virtual machine instance;
    launch the virtual machine instance;
    obtain a temporary set of credentials generated by the virtual machine instance;
    authenticate, using the directory domain controller, that the user is authorized to join the directory based at least in part on the generated temporary set of credentials;
    cause an account for the virtual machine instance to be generated based on authenticating the temporary set of credentials generated by the virtual machine instance; and
    cause the account of the virtual machine instance to be associated with the directory based at least in part on the configuration information and authentication of the temporary set of credentials.

6. The computer system of claim 5, wherein the configuration information includes a fully qualified domain name for the directory and one or more domain name system Internet Protocol addresses for the directory, the fully qualified domain name and the domain name system Internet Protocol addresses usable by the virtual machine instance to establish a communications channel with the directory domain controller of the directory.

7. The computer system of claim 5, wherein the computer system further comprises the virtual machine instance; and
  execution of the instructions causes the virtual machine instance to:
    receive a second request to access the virtual machine instance, the second request to access the virtual machine instance including the temporary set of credentials for the user;
    determine whether the temporary set of credentials for the user are valid;
    transmit, to an identity management service, a third request to determine whether the user is authorized to access the directory; and
    as a result of the user not being authorized to access the directory, cause the virtual machine instance to prevent the user from using the virtual machine instance to access the directory.

8. The computer system of claim 5, wherein the memory further includes instructions that, as a result of being executed by one or more processors, cause the computer system to:
  launch, by a virtual computer system service, the virtual machine instance; and
  store the configuration information within a database accessible by a server, such that the configuration information is associated with identification information for the virtual machine instance.

9. The computer system of claim 5, wherein instructions that cause the computer system to cause the virtual machine instance to be associated with the directory further include instructions that, as a result of being executed by one or more processors, cause the computer system to cause the virtual machine instance to transmit a second request to a managed directory service to establish a communications channel with the virtual machine instance, through the managed directory service, to the directory domain controller of the directory.

10. The computer system of claim 5, wherein:
  the computer system further comprises the virtual machine instance; and
  execution of the instructions causes the virtual machine instance to:
    generate a set of computer credentials, the set of computer credentials used by the directory to verify that the user of the virtual machine instance is authorized to join the virtual machine instance to the directory and to generate a computer account to join the virtual machine instance to the directory;
    provide the set of computer credentials to the directory; and
    expose an application programming interface to an operating system of the virtual machine instance to allow the virtual machine instance to join the directory.

11. The computer system of claim 5, wherein the virtual machine instance is hosted by a virtual computer system service on behalf of a customer of the virtual computer system service, the virtual computer system service being different than a managed directory service that maintains the directory.

12. The computer system of claim 5, wherein the memory further includes instructions that, as a result of being executed by one or more processors, cause the computer system to:
  obtain a location of a file system associated with the directory; and provide the virtual machine instance with the location such that the virtual machine instance can access the file system associated with the directory.

13. A non-transitory computer-readable storage medium storing executable instructions that, as a result of being executed by one or more processors of a computer system, cause the computer system to at least:
- receive, at a virtual computing system service of a computing resource service provider, a first request from a user to launch a virtual machine instance to be joined to a directory, the directory associated with a directory domain controller;
- transmit, to a server separate from the virtual computing system service, a second request to obtain configuration information associated with the directory;
- receive, from the server, the configuration information;
- launch, by the virtual computing system service, the virtual machine instance;
- transmit, to the server, a temporary set of credentials generated by an automated agent within the virtual machine instance;
- authenticate, using the directory domain controller, that the user is authorized to join the directory based at least in part on the temporary set of credentials;
- cause an account for the virtual machine instance to be generated as a result of authenticating the temporary set of credentials; and
- use the configuration information and the temporary set of credentials generated by the automated agent to join the virtual machine instance to the directory.

14. The non-transitory computer-readable storage medium of claim 13, wherein the instructions further include instructions that, as a result of being executed by one or more processors, cause the computer system to:
- in response to the virtual machine instance having received a third request from the user to access the virtual machine instance, transmit, to an identity management service, a fourth request to determine whether the user is authorized to access the directory; and
- as a result of the user not being authorized to access the directory, prevent the user from using the virtual machine instance to access the directory.

15. The non-transitory computer-readable storage medium of claim 13, wherein the instructions further include instructions that, as a result of being executed by one or more processors, cause the computer system to transmit a third request to a managed directory service to establish a communications channel between the virtual machine instance and the directory domain controller.

16. The non-transitory computer-readable storage medium of claim 13, wherein the configuration information includes a fully qualified domain name for the directory and a domain name system Internet Protocol address for the directory, the fully qualified domain name and the domain name system Internet Protocol addresses used to establish a communications channel with the directory domain controller.

17. The non-transitory computer-readable storage medium of claim 13, wherein the virtual machine instance is hosted by the virtual computer system service on behalf of a customer of the virtual computer system service, the virtual computer system service being different than a managed directory service that maintains the directory.

18. The non-transitory computer-readable storage medium of claim 13, wherein the configuration information is stored within a database of the server, the configuration information being stored within the database in response to a previous request to launch the virtual machine instance and join the virtual machine instance to the directory.

19. The non-transitory computer-readable storage medium of claim 13, wherein the instructions further include instructions that, as a result of being executed by one or more processors, cause the computer system to cause the server to utilize a customer identifier associated with the request to determine one or more policies associated with the user utilizing the virtual machine instance specify that the user is authorized to join the virtual machine instance to the directory.

20. The non-transitory computer-readable storage medium of claim 13, wherein the instructions that cause the computer system to join the virtual machine instance to the directory further instructions that, as a result of being executed by one or more processors, cause the computer system to cause an operating system of the virtual machine instance to join the virtual machine instance to the directory.

* * * * *